United States Patent [19]

Fukui et al.

[11] Patent Number: 4,715,235

[45] Date of Patent: Dec. 29, 1987

[54] DEFORMATION SENSITIVE ELECTROCONDUCTIVE KNITTED OR WOVEN FABRIC AND DEFORMATION SENSITIVE ELECTROCONDUCTIVE DEVICE COMPRISING THE SAME

[75] Inventors: Minoru Fukui, Toyomaka; Naoki Kataoka, Kyoto, both of Japan

[73] Assignee: Asahi Kasei Kogyo Kabushiki Kaisha, Japan

[21] Appl. No.: 834,785

[22] Filed: Feb. 28, 1986

[30] Foreign Application Priority Data

| Mar. 4, 1985 | [JP] | Japan | 60-41024 |
| May 14, 1985 | [JP] | Japan | 60-100482 |
| Sep. 30, 1985 | [JP] | Japan | 60-214664 |
| Sep. 30, 1985 | [JP] | Japan | 60-214665 |

[51] Int. Cl.$^4$ ............................ G01L 1/18; H01C 10/10
[52] U.S. Cl. ........................... 73/862.68; 338/99; 338/114; 73/775
[58] Field of Search ............ 73/774, 775, 159, 765, 73/862.68; 338/47, 13, 114, 6, 99; 174/121 R, 122 R, 124 R

[56] References Cited

U.S. PATENT DOCUMENTS

| 3,268,845 | 8/1966 | Whitmore | 338/47 |
| 3,398,233 | 8/1968 | Lizasoan et al. | 338/114 |
| 3,738,162 | 6/1973 | Dally et al. | 73/775 |
| 3,820,528 | 3/1974 | Gause et al. | 338/114 |
| 3,858,440 | 1/1975 | Budraitis | 73/782 |
| 4,290,311 | 9/1981 | Brewer | 73/730 |
| 4,429,580 | 2/1984 | Testa et al. | 73/159 |
| 4,580,569 | 4/1986 | Petrofsky | 128/420 A |
| 4,659,873 | 4/1987 | Gibson et al. | 338/99 |

FOREIGN PATENT DOCUMENTS 1557588 12/1979 United Kingdom ............... 338/114

*Primary Examiner*—Stewart J. Levy
*Assistant Examiner*—Robert R. Raevis
*Attorney, Agent, or Firm*—Finnegan, Henderson, Farabow, Garrett & Dunner

[57] ABSTRACT

The deformation sensitive electroconductive knitted or woven fabric of the present invention is a knitted or woven fabric, which can be changed in electroconductivity at the deformed portion when the deformation of stretch or compression is applied thereon by maintaining in the certain ratio of the number of electrically insulating portions to the number of electroconductive portions at the intertwined portions of the fibers and/or the portions between the intertwined portions of the fibers. By using this knitted or woven fabric directly or a deformation sensitive electroconductive sheet having an elastomer laminated on at least one surface of the knitted or woven fabric, it can be utilized as an stretch sensitive electroconductive device or pressure sensitive electroconductive device provided electrodes capable of detecting the changes in electroconductivity corresponding to deformations as electrical characteristics such as electrical resistance. This deformation sensitive electroconductive device is more excellent in measurement of great deformations and durability in repeated uses as compared with the pressure sensitive electroconductive device using the pressure sensitive electroconductive elastomer sheet mixed with electroconductive fillers which has been used in the prior art.

48 Claims, 55 Drawing Figures

FIG. 1
FIG. 2
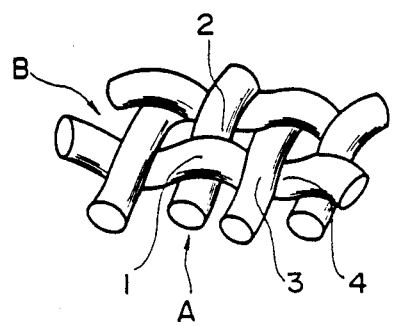
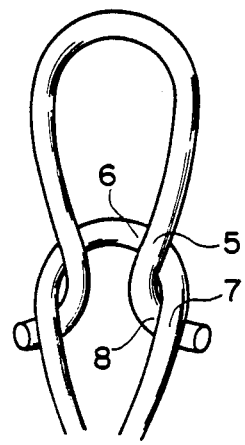
FIG. 3
FIG. 4
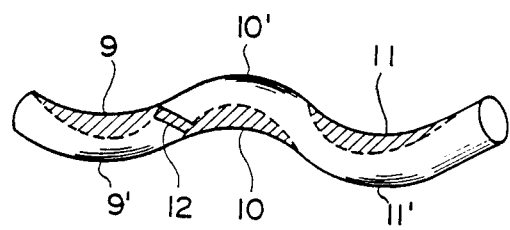
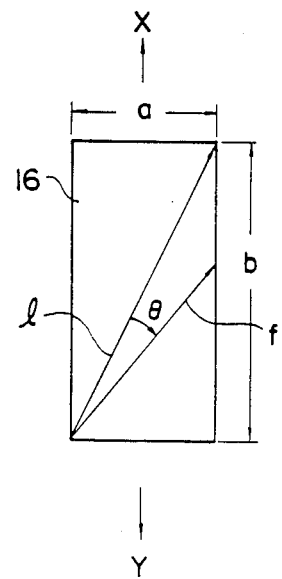

DEFORMATION SENSITIVE ELECTROCONDUCTIVE KNITTED OR WOVEN FABRIC AND DEFORMATION SENSITIVE ELECTROCONDUCTIVE DEVICE COMPRISING THE SAME

BACKGROUND OF THE INVENTION (1) Field of the Invention

This invention relates to a deformation sensitive electroconductive knitted or woven fabric which is changed in electroconductivity at the deformed portion, when a deformation such as stretch or compression is applied.

More specifically, the present invention relates to a deformation sensitive electroconductive knitted or woven fabric which is changed in electroconductivity by one figure or more at the portion deformed by deformation such as stretch or compression as compared with that before deformation, also to a deformation sensitive electroconductive device having electrodes provided on the deformation sensitive electroconductive knitted or woven fabric which can detect the change in electroconductivity which occurs by deformation of said knitted or woven fabric by electrical characteristics such as electrical resistance, and further to a deformation detecting unit having a means for fixing the deformable electroconductive device onto a subject to be tested.

(2) Description of the Prior Art

In the prior art, as the materials which are changed in electrical characteristics such as electrical resistance by compression deformation, there have been known pressure sensitive electroconductive sheets in which electroconductive metal particles, etc. are mixed in a rubber base material such as silicone rubber. These are disclosed in, for example, U.S. Pat. No. 4,138,369 (corresponding Patents: DE No. 2744800, Japanese Laid-open Patent Publication Nos. 43749/1978, 102957/1978) as the material in which electroconductive metal particles and an alkyltitanate compound are mixed in a silicon rubber and in U.S. Pat. No. 4,273,682 (corresponding Patents: DE No. 2757870, Japanese Laid-open Patent Publications Nos. 79937/1978 and 80350/1979) as the material in which electroconductive materials comprising asbestos-like graphite particles of about 40 to 160 $\mu$m are mixed.

These elastomer sheets are made to exhibit pressure sensitive electroconductivity by mixing electroconductive fillers such as electroconductive carbon into elastomer sheets.

However, for pressure sensitive electroconductivity to be exhibited, a large amount of electroconductive fillers is required to be mixed, whereby inherent rubber elasticity of an elastomer is markedly damaged and the most important practical characteristic of durability against repeated compression deformation becomes poor. Also, since it is difficult to mix the above electroconductive fillers with good reproducibility, uniformness is poor and therefore reproducibility in electrical resistance change corresponding to compression deformation is inferior. Accordingly, when employed for, for example, a sensor, it is lacking reliability and hence difficulty applicable for uses in which high reliability is demanded.

On the other hand, electroconductive knitted or woven fabrics endowed with electroconductivity by metal plating, etc. have also been known and used in uses such as electromagnetic wave shielding material, electrode plates, etc. These may include, for example, an electroconductive fabric formed by first applying coating of a synthetic resin solution on a fabric to fill up between the crossed portions, carrying out chemical plating and further electroplating thereon to provide a synthetic resin layer thereon with an aim to obtain an electrically conductive fibrous fabric, as disclosed in Japanese Patent Publication No. 27400/1965; a microwave or high frequency shielding material prepared by formation of a metal layer with a thickness of 0.02 to 2 $\mu$m on a fibrous sheet such as knitted or woven fabric, as disclosed in U.S. Pat. No. 4,439,768 (corresponding Patents: EP-10712, Japanese Laid-open Patent Publication No. 74200/1980); and a material for uses such as electromagenetic wave shielding, static charge removal and reflection of electrical radiation formed by a metal layer by performing arc flame spray coating on a woven fabric or unwoven fabric, as disclosed in Japanese Laid-open Patent Publication No. 18340/1985.

These electroconductive knitted or woven fabrics have been utilized as materials having electroconductivity or materials for reflecting electrical radiation, and not utilized as the material which is changed in electrical characteristics by compression deformation such as the pressure sensitive elastomer as described above or by stretch deformation as in the present invention.

Thus, there has been no pressure sensitive electroconductive material having high reliability at all, and there is also no pressure sensitive electroconductive material utilizing a knitted or woven fabric.

Further, there has been no technical thought concerning other deformation than compression deformation, for example, the so called stretch sensitive electroconductivity which means change in electroconductivity by stretch deformation, as a matter of course, and there existed no material which can exhibit such stretch sensitive electroconductivity at all.

SUMMARY OF THE INVENTION

A first object of the present invention is to provide a deformation sensitive electroconductive knitted or woven fabric which is changed in electrical characteristics at the portion deformed by deformation such as stretch or compression from those before deformation. With the use of such a fabric, it has been rendered possible to improve durability in repeated compression deformations and reproducibility of electrical resistance change, which have been the drawbacks of the pressure sensitive electroconductive elastomer sheet known in the art to a great extent and utilize it for uses for which high reliability is demanded. Further, what is particularly noted here is to provide the so called technical thought of stretch sensitive electroconductivity that electroconductivity changes through stretch deformation, and also a material capable of exhibiting such stretch sensitive electroconductivity which has not existed in the prior art.

A second object of the present invention is to provide a deformation sensitive electroconductive device which can detect changes in electroconductivity formed by deformation by electrical characteristics such as electrical resistance, etc. by providing electrodes on at least two positions on the deformation sensitive electroconductive knitted or woven fabric as mentioned above.

A third object of the present invention is to provide a deformation detection unit having a means for fixing the above deformation sensitive electroconductive device onto a subject to be tested, etc.

BRIEF DESCRIPTION OF THE DRAWINGS

FIG. 1. represents a deformation sensitive electroconductive plain weave fabric and FIG. 2 a deformation sensitive electroconductive plain knitted fabric, wherein A shows warp, B weft, 1, 2, 3, 4, 5, 6, 7 and 8 are portions of the fibers intertwined with each other, corresponding to the positions at which needle electrodes are contacted when measuring electrical resistance values of the intertwined portions;

FIG. 3 is a schematic illustration of the fiber constituting the deformation sensitive electroconductive plain weave fabric of the present invention, in which the shadowed portion means electrically insulating state, and the white portion means electrically conductive state, 9, 10 and 11 are centers of the intertwined portions (portions encircled with dotted lines), 9', 10' and 11' are centers of the portions on the opposite side to the intertwined portions (white portions in the drawing), and 12 is a portion under electrically insulating state between the adjacent intertwined portions;

FIG. 4 is a model chart showing the relationship between the shape of the stretch sensitive electroconductive fabric strip according to the present invention and the slanted direction of the electroconductive fiber;

DESCRIPTION OF THE PREFERRED EMBODIMENTS

Figure 5A:
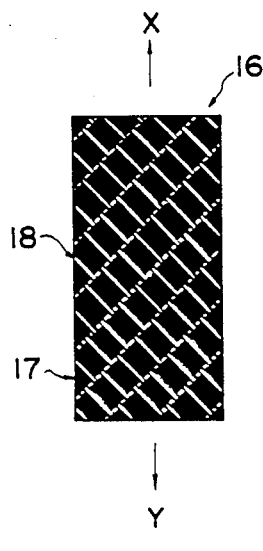
FIG. 5 is a plain view of a fabric strip showing arrangement of electroconductive fiber and insulating fiber before stretch deformation (a) and after stretch deformation (b) of the stretch sensitive electroconductive fabric strip.

The present invention includes:

A. a deformation sensitive electroconductive knitted or woven fabric which is changed by one figure or more in electrical resistance at the deformed portion through deformation such as stretch or compression;

B. a deformation sensitive electroconductive sheet having an elastomer laminated on at least one surface of the above deformation sensitive electroconductive knitted or woven fabric, and C. a deformation sensitive electroconductive device comprising electrodes on at least two positions of the above deformation sensitive electroconductive knitted or woven fabric strip or the above deformation sensitive electroconductive sheet to be made detectable of the deformation amount of the above knitted or woven fabric strip or sheet strip as electrical characteristics such as electrical resistance, etc.

Details of these are to be described below.

A. Deformation sensitive electroconductive knitted or woven fabric

The desirable deformation sensitive electroconductive knitted or woven fabric of the present invention includes:

(1) a deformation sensitive electroconductive knitted fabric, wherein the ratio of the number of the portions under electrically insulating condition to the number of the portions under electroconductive condition at the intertwined portions of the fibers constituting the deformation sensitive electroconductive knitted fabric is 1/90 or more.

(2) a deformation sensitive electroconductive woven fabric, wherein the ratio of the number of the portions under electrically insulating condition to the number of the portions under electroconductive condition at each of the intertwined portions of the fibers and the portions between adjacent intertwined portions of the fibers constituting the deformation sensitive electroconductive woven fabric is 1/9 or more; and (3) an stretch sensitive electroconductive woven fabric, comprising a plural number of longitudinal fibers and lateral fibers constituting a fabric strip having a shape which is substantially rectangular, in which conductive fibers are used for one of the longitudinal and lateral fibers constituting said fabric and insulating fibers for the other, and the longitudinal fibers and lateral fibers constituting said fabric strip are slanted relative to the longer direction of the fabric strip.

Details of these are to be described below.

A-(1) Deformation sensitive electroconductive knitted fabric

First, deformation sensitive electroconductive knitted fabric is to be explained. Deformation sensitive electroconductive knitted fabrics satisfy the following conditions of electrical insulating or conductive property at the intertwined portions of the fibers constituting the fabric. That is, if the number of the intertwined portions under insulating conditions of the fibers within unit surface area is defined as $k_1$ and those under electroconductive state as $k_2$, the ratio $k_1/k_2$ should be 1/90 or more.

Here, the intertwined portion refers to the portion where respective fibers cross each other, indicating the crossed portion between loops. The texture of the knitted fabric may be either warp or weft stitch and may be any of tricot stitch, plain stitch, rib stitch, pearl stitch, etc. Particularly, in the case of pearl stitch, substantially uniform deformation sensitive electroconductivity can be preferably obtained in any direction of the knitted texture. Deformation sensitive electroconductivity relative to minute deformation and great deformation may be obtained by adequate selection of the texture of the fabric, respectively. The shape of the knitted fabric may include all shapes employing the texture of knitted fabric such as sheet, cylinder, etc. As the fibers constituting said knitted fabric, there may be used spun fibers comprising monofilaments, multifilaments spun by means of a melt or wet spinning machine, or spun yarns made of short fibers, twisted yarns of those fibers, slitted products of films or sheets or sheathed products thereof. Their materials may include all electrically insulating synthetic polymers such as nylon, polyester, regenerated cellulose fibers, electrically insulating natural polymers such as natural rubber, etc., and electrically insulating inorganic fibers such as of glass. Those are imparted with electroconductivity by such electroconductivity imparting means as plating, coating or flame spray coating of electroconductive materials such as copper, nickel, silver, carbon, etc. In the case of a multi-filament or a spun yarn, respective filaments or short fibers contact each other with minimum stress, which is more preferable for formation of a high sensitivity deformation sensitive electroconductive knitted fabric. The electrically insulating condition as herein mentioned refers to the state when the electrical resistance value between the two needle terminals is $10^6\Omega$ or higher as measured according to the method for measurement of electrical resistance ($\Omega$) as described in Examples, while the electroconductive condition means the state when the electrical resistance value measured similarly between the two needle terminals is less than $10^6\Omega$.

The present inventors have found, in a knitted fabric that electrical characteristics such as electrical resistance of the knitted fabric will be changed when subjected to deformation such as stretch or compression even if all the fibers constituting the fabric may be electroconductive fibers having electroconductive condition, provided that the ratio of the number of the fibers under electrically insulating state to those under electroconductive state is 1/90 or more.

Referring now to the drawings, the deformation sensitive electroconductive knitted fabric is to be described in detail.

FIG. 2 shows the case of a plain stitch fabric. The intertwined portion under electrically insulating condition or the intertwined portion under electrically conductive condition means the portion where the two fibers intertwined are under electrically insulating condition or under electrically conductive condition through the intertwined portion, respectively. For example, it means whether 5 and 6, or 7 and 8 are under electrically insulating condition or electrically conductive condition. Of the all intertwined portions constituting unit area of said knitted fabric, if the ratio of the number $k_1$ of the intertwined portions under electrically insulating state to the number $k_2$ of the intertwined portions under electroconductive state, namely $k_1/k_2$, is 1/90 or more, the texture will be deformed through the deforming action such as stretch and compression to cause slippage, torsion, changes in angle formed by the intertwined fibers or changes in contact area, whereby electrical contact occurs at the intertwined portions which were under electrically insulating state before deformation, thus causing lowering in electrical resistance ($\Omega$) in the deformed direction or at the deformed part to give a knitted fabric having deformation sensitive electroconductivity. If the ratio of the number $k_1$ of the intertwined portions under electrically insulating state to the number $k_2$ of the intertwined portions under electroconductive state, namely $k_1/k_2$, is 1/9 or more and $10^3$ or less, changes in electrical resistance during deformation can be more preferably marked.

Also, desirably in the case when the knitted fabric is in shape of a sheet, the sheet can become a pressure sensitive electroconductive cloth with higher density and higher sensitivity in the thickness direction of the sheet as the ratio of the number of intertwined portions under electrically insulating condition to the whole number of intertwined portions is increased.

Such a deformation sensitive electroconductive knitted fabric may be obtained by preparing electroconductive fibers having imparted an electroconductive material to electrically insulating fibers by means of plating, coating, flame spray coating, etc. and knitting these fibers, or alternatively by knitting previously an electrically insulating knitted fabric and then imparting an electroconductive material thereto by means of plating, coating, flame spray coating, etc. That is, the deformation sensitive electroconductive knitted fabric can be also obtained by knitting the deknitted yarns of knitted fabrics imparted with an electroconductive material by the mean of above mentioned method. However, in order to obtain the above mentioned deformation sensitive electroconductive knitted fabrics having ratio $k_1/k_2$ of 1/90 or more, it is preferable to be prepared by means of plating, coating, flame spray coating etc. of changed conditions or, physical treatment such as ultrasonic vibration, high speed jetting of water or air, or in laminar flow or turbulent flow with great flow velocity difference as hereinafter described.

A-(2) Deformation sensitive electroconductive woven fabric

This deformation sensitive electroconductive woven fabric is required to satisfy the following conditions.

(1) Of all the intertwined portion within a certain area of said woven fabric, the ratio of the number $k_1$ of the intertwined portions under electrically insulating state to those under electrically conductive state $k_2$, namely $k_1/k_2$, should 1/9 or more, and (2) for the portions between adjacent intertwined portions at a certain length in the longer direction of the respective fibers constituting said woven fabric, the ratio of the number $m_1$ of the portions between the intertwined portions under electrically insulating state to the number $m_2$ of the portions between the intertwined portions under electrically conductive state, namely $m_1/m_2$, should be 1/9 or more.

The intertwined portion as herein mentioned refers to the portion where warp and weft fibers cross each other, and they are not necessarily required to contact each other.

The texture of the woven fabric may be either plain weave, twill weave or satin weave, particularly preferably plain weave, since its texture is dense, excellent in durability during repeated uses and also it can be changed in resistance value with high sensitivity corresponding to minute deformation. The deformation sensitive electroconductivity relative to minute deformation or great deformation can be obtained by selecting adequately the texture of the fabric.

The fibers and its materials constituting the woven fabric may be the same as those as mentioned above for the knitted fabric. The deformation sensitive electroconductive woven fabric of the present invention is placed at only specific portions of the constituent fibers under electrically insulating condition, and endowed at other portions with electroconductivity with an electroconductive material such as copper, nickel, silver, carbon, etc. by means of plating, coating, flame spray coating, etc. Particularly, in the case of a multifilament or spun yarn, respective filaments or short fibers can contact each other with minimum stress, which is more preferable for formation of deformation sensitive electroconductive fabric of high sensitivity. The electrically insulating condition as herein mentioned refers to the state when the electrical resistance value between the two needle terminals is $10^6\Omega$ or higher as measured according to the method for measurement of electrical resistance ($\Omega$) as described in Examples, while the electroconductive condition means the state when the electrical resistance value measured similarly between the two needle terminals is less than $10^6\Omega$.

The present inventors have found that the changes in texture structure occur through changes in angle formed by two crossing fibers by slippage or torsion at the intertwined portion of respective fibers simultaneously with deformation of each fiber itself when deforming action such as stretch or compression is given to a fabric, and the changes in the texture structure and/or tightness of fibers induce changes in electrical resistance value, thus being successful in development of a deformation sensitive electroconductive woven fabric.

Referring now to FIG. 1 and FIG. 3, the deformation sensitive electroconductive fabric is to be explained.

In FIG. 1, A shows a longitudinal fiber (warp) and B a lateral fiber (weft). FIG. 3 shows as schematic illustration of the fiber constituting the deformation sensitive electroconductive woven fabric. FIG. 3 is a part of the fiber constituting a plain weave fabric, the shadowed portion representing the portion under electrically insulating state, while the white portion the portion under electrically conductive state.

The intertwined portion under electrically insulating condition or the intertwined portion under electrically conductive condition means the portion where the two fibers intertwined are under electrically insulating condition or under electrically conductive condition through the intertwined portion, respectively. For example, it means whether 1 and 2, or 3 and 4 in FIG. 1 are under electrically insulating condition or electrically conductive condition. Also, the portion between the adjacent intertwined portions is more precisely the portion between the centers of the intertwined portions, which means the portion between the centers of adjacent intertwined portions of one fiber, meaning substantially the portion between the centers of the two adjacent portions of the portions on the opposite side to the intertwined portions, corresponding, for example, to the portion between 9' and 10', and the portion between 10' and 11', in FIG. 3. In FIGS. 3, 9, 10 and 11 represent the centers of the intertwined portions (encircled shadowed portions in the Figure), while 9', 10' and 11' in FIG. 3 represent the centers of the intertwined portions on the opposite side to the intertwined portions (white portions in the Figure).

By electrically insulating condition between the intertwined portions or electrically conductive condition between the intertwined portions is meant whether the portion between the adjacent intertwined portions as mentioned above is under electrically insulating state or conductive state. For example, if the shadowed portion is under insulating condition, the portion between 9' and 10' in FIG. 3 corresponds to the portion between intertwined portions under electrically insulating condition due to arrangement of the insulating portion 12, while the portion between 10' and 11' corresponds to the portion under electrically conductive state. If, of all the intertwined portions constituting said fabric of unit area, the ratio of the number $k_1$ of the intertwined portions under electrically insulating condition to the number $k_2$ of the intertwined portions under electrically conductive state, namely $k_1/k_2$, is 1/9 or more, and, of all the portions between the adjacent intertwined portions in unit length of each fiber constituting said fabric, the number $m_1$ of the portions between the intertwined portions under electrically insulating state to the number $m_2$ of the portions between the intertwined portions under conductive state, namely $m_1/m_2$, is 1/9 or more, there may occur slippage, torsion of fibers, or changes in angle formed by the intertwined fibers through deformation of the texture by the deforming action such as stretch or compression. Also simultaneously, through tightening of the fibers, changes in contact area may occur. That is, the intertwined portions or the portions between the intertwined portions under electrically insulating state before deformation can be changed into the portions under electroconductive state, whereby lowering in electrical resistance in the deformed direction or at the deformed portion and the fabric becomes a fabric having deformation sensitive electroconductivity.

At the portion between the intertwined portions of fibers in the deformation sensitive electroconductive fabric, it is required that a small portion under electrically conductive state should be arranged at least at one site in the direction of length. The length of this small portion is shorter than that of the portion between the intertwined portions.

If the the number $k_1$ of the intertwined portions under electrically insulating condition to the number $k_2$ of the intertwined portions under electrically conductive state, namely $k_1/k_2$, is $\frac{1}{9}$ or more and $10^3$ or less, and, the number $m_1$ of the portions between the intertwined portions under electrically insulating state to the number $m_2$ of the portions between the intertwined portions under electroconductive state, namely $m_1/m_2$, is $\frac{1}{9}$ or more and $10^3$ or less, the change in resistance value is more preferably marked during deformation. Also desirably, when the shape of the fabric is a sheet, the fabric will become a pressure sensitive electroconductive fabric with higher density and higher sensitivity in the thickness direction of the sheet as the proportion of the intertwined portions and the portions between the intertwined portions under electrically insulating condition is increased. If, of all the intertwined portions constituting said fabric of unit area, the ratio of the number $k_1$ of the intertwined portions under electrically insulating state to the number $k_2$ of the intertwined portions under electrically conductive state, namely $k_1/k_2$, is less than 1/9, or, of all the portions between the adjacent intertwined portions in unit length of each fiber constituting said fabric, the number $m_1$ of portions between the intertwined portions under electrically insulating state to the number $m_2$ of the portions between the intertwined portions under conductive state, namely $m_1/m_2$, is less than 1/9, due to the small number of the intertwined portions and the portions between the intertwined portions under electrically insulating state, the resistance value will be little changed in the deformation direction, even when texture deformation may occur, whereby substantially no deformation sensitive electroconductive fabric can be obtained.

Next, the method for preparation of the deformation sensitive electroconductive fabric is to be explained.

That is, a fabric made of an electroconductive fiber endowed with an electroconductive substance by subjecting an electrically insulating fiber to a means such as plating, coating, flame spray coating, etc. or an electroconductive fabric endowed with an electroconductive substance by subjecting an electrically insulating fabric to a means such as plating, coating, flame spray coating, etc. is prepared. By applying mechanical stress to this fabric by way of ultrasonic vibration, high speed jetting of water or air, or in a medium where laminar flow or turbulent flow with great velocity difference occurs, thereby peeling off the electroconductive substance selectively at the intertwined portions and the portions between the intertwined portions, whereby deformation sensitive electroconductive fabric can be for the first time realized.

In this case, use of an electroconductive fabric endowed with an electroconductive substance prepared from an electrically insulating fabric by such means as plating, coating, flame spray coating, etc. is more preferable, because the electroconductive substance will be imparted with difficulty to the portion where intertwined portions are substantially in contact but it is imparted so as to cover the crossed fibers, and therefore the electroconductive substance can readily be removed by application of physical stress to give easily a deformation sensitive electroconductive fabric.

For making easier peel-off of the electroconductive substance at the intertwined portions and the portions between the intertwined portions, it is more effective to add fine powder to the fiber or the fabric before imparting electroconductivity thereto, or, in the case of a polyester fiber, to alleviate slightly the weight reduction treatment with an alkali. Also, a deformation sensitive electroconductive fabric can be applied more easily by applying the physical working on a fabric prepared by use of the fibers deknitted from the electroconductive knitted fabric in which the electroconductive substance is imparted to an electrically insulating knitted fabric according to the means as already described.

A-(3) Stretch sensitive electroconductive fabric

Finally, an stretch sensitive electroconductive fabric is to be explained.

The stretch sensitive electroconductive fabric according to the present invention can be obtained by cutting a fabric obtained by fabrication using an electroconductive fiber for either one of the longitudinal fiber and the lateral fiber and an insulating fiber for the other in the oblique direction relative to the directions of the longitudinal fiber and the lateral fiber arranged, for example, into a rectangular piece. The meaning of "rectangular" should not be taken strictly, but it may sometimes include square shape, and also the respective sides are not necessarily required to be straight. In the stretch sensitive electroconductive fabric strip under this state, the electroconductive fibers used for either one of the longitudinal and lateral fibers are arranged in parallel to each other with intervals therebetween, said intervals being maintained with insulating fibers intertwined therewith, whereby complete contact between the adjacent conductive fibers will not practically occur. On the other hand, in the stretch sensitive electroconductive fabric strip according to the present invention, since the longitudinal fiber and the lateral fiber are arranged obliquely relatively to the longer direction of the fabric strip, if the fabric strip is drawn in the direction in the longer direction of the fabric strip or in the direction perpendicular thereto, more specifically in the direction coming out of the direction in which the fibers are arranged, the fabric texture can be deformed to be stretched easily in the direction drawn. By deformation of the fabric texture, electroconductive fibers arranged for either one of the longitudinal or lateral fibers will approach to and contact each other, to result in reduction of the electrical resistance value of the fabric strip. Also, by utilizing contrariwise this property, the extent of the stretch deformation applied on the fabric strip can be grasped from the change in electrical resistance value.

As herein mentioned, to have an stretch sensitive electroconductivity in the stretch sensitive electroconductive fabric strip, it is generally required that the electrical resistance value in the stretched direction should be lowered by one figure when an stretch deformation is applied on the fabric strip in the longer direction or the direction perpendicular thereto. The fabric texture of the stretch sensitive electroconductive fabric strip may be either plain weave, twill weave, satin weave, etc. The insulating fiber constituting the fabric strip means a filament spun by conventional melt, wet spinning method, etc. or multifilament fiber thereof, a spun yarn comprising short fibers or a twisted yarn thereof, slender shaped products prepared by slitting films or sheets or bundles thereof, and its material may include electrically insulating synthetic polymers such as nylon, polyester, acryl, etc., electrically insulating natural polymers such as cellulose, natural rubber, etc., regenerated cellulose fibers such as rayon, electrically insulating inorganic fibers such as glass, etc. On the other hand, electroconductive fibers constituting the fabric strip may include monofilaments or twisted yarns comprising stainless steel, nichrome wire, copper wire, carbon fiber, etc. or monofilaments or twisted yarns of electrically insulating fibers applied with electroconductive subtances such as copper, nickel, silver, zinc, aluminum, carbon, etc. by electroconductivity imparting means such as plating, coating, flame spray coating, etc.

The stretch sensitive electroconductivity of the fabric strip is determined depending on readiness in contact between the electroconductive fibers on stretch. Particularly, when electroconductive yarns are spun yarns, due to the presence of fluff on the surface of yarn, contact between electroconductive yarns will readily occur to give a stretch sensitive electroconductive fabric strip of high sensitivity. This readiness in contact is determined not only by the kind of the electroconductive fiber, but also influenced by fabric density or the kind of the insulating fiber, namely difference in thickness or hardness between the electroconductive fiber and the insulating fiber. As to fabric density, the electroconductive fiber rather than the insulating fiber should be greater in order to effect contact between the electroconductive fibers more readily. As the difference in thickness or hardness between the electroconductive fiber and the insulating fiber, the insulating fiber should be more slender or harder to effect contact between the electroconductive fibers more readily, thus providing stretch sensitive electroconductivity preferably with ease. Also, if the intertwined point between the electroconductive fiber and the insulating fiber is fixed by adhesion, contact between the electroconductive fibers will readily occur, and slip will occur with difficulty, whereby strength can also preferably be improved.

The stretch sensitive electroconductivity of the present invention can be obtained for the first time when elongated in the direction slanted relative to the directions of the longitudinal fiber and the lateral fiber. If drawn in the longitudinal fiber direction or the lateral fiber direction, no texture deformation will occur, whereby no contact between the electroconductive fibers will occur to give no stretch sensitive electroconductivity.

The electrical resistance value of the stretch sensitive electroconductive fabric strip and its change by stretch will also be influenced by the direction in which the fabric having the constitution as described above is cut and the size of the fabric strip. For example, as shown in FIG. 4, when the stretch sensitive electroconductive fabric strip 16 of the present invention is rectangular having a width a and a length b, and the stretch direction is in the direction of X Y, the angle $\theta$ formed for its diagonal line l in the slanted direction f of the longitudinal fiber or the lateral fiber using an electroconductive fiber should preferably be + in the direction of the arrowhead as shown in FIG. 4 (namely in the direction in which f is slanted to the horizontal side relative to l). In this case, since there is no electroconductive fiber reaching the both ends of the fabric strip 16 in the longer direction, the electrical resistance value of the fabric strip before subjected to stretch will be increased. If, on the contrary, the slated direction f of the longitudinal fiber or the lateral fiber using an electroconductive fiber is erected on the vertical side from the diagonal line l, there exists an electroconductive fiber reaching both ends in the longer direction, whereby the electrical resistance value in the X Y direction will become lower even before stretch deformation. This is not preferable because the extent of lowering in electrical resistance by stretch deformation is made smaller. On the other hand, also in view of readiness in stretch of the fabric strip, it is preferable that the longitudinal fiber or the lateral fiber using an electroconductive fiber should be arranged in the slanted direction f as shown in FIG. 4. This is because, in this case, the fiber interfering with the stretch in the X Y direction does not extend to both end portions in the longer direction. When the longitudinal fiber density and the lateral fiber density are exactly the same, if a fabric strip is made by cutting in the direction of 45° relative to the directions of the longitudinal fiber and the lateral fiber, the fabric strip will readily cause uniform texture deformation during stretch. As can be easily understood from the above explanation, more preferable cutting direction, namely more preferable value of the slanted angle of the longitudinal fiber or the lateral fiber relative to the longer direction of the fabric strip is affected by the width a and the length b of the fabric strip. To say contrariwise, the width a and the length b of the fabric strip are determined by the use of the stretch sensitive electroconductive fabric strip, and the above slanted angle may be determined based on the values of a and b thus determined.

Figure 5B:
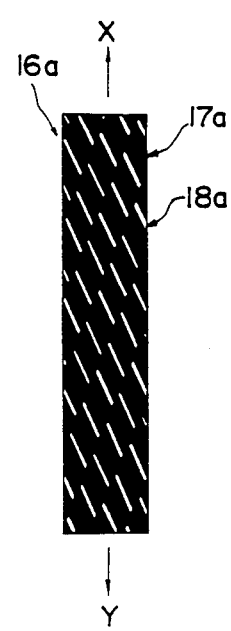

Next, by referring to FIG. 5, the mechanism in which stretch sensitive electroconductivity is to be obtained by stretch of the stretch sensitive electroconductive fabric strip is to be explained. FIG. 5 is a schematic illustration of the texture of the stretch sensitive electroconductive fabric strip cut on the bias 16, (a) showing the original state before stretch deformation, (b) the state after stretch deformation. Electroconductive fiber is shown by 17 in FIG. 5 (a), and insulating fiber by 18. Under the state (a), the fabric is electrically insulating due to presence of space between the electroconductive fibers 17 without contact, while, under the stretched state (b), contact between electroconductive fibers 17a occurs due to texture deformation, whereby the span between X and Y becomes electroconductive. If cutting is not done as in the present invention, electroconductivity is already effected under the original state before stretch deformation, or no electroconductivity is effected at all. Also, if stretch deformation may be applied, substantially no change in electrical resistance value will occur, whereby no stretch sensitive electroconductive fabric strip can be obtained. Although, in the case of FIG. 5, there is shown an extreme example in which the change occurs from the insulating state (a) in which electroconductive fibers are not contacted with each other to the conductive state (b) after stretch deformation, there may already exist contact between the electroconductive fibers under the original state before stretch deformation to some extent without being electrically insulating, provided that the contact between electroconductive fibers can occur more firmly after stretch deformation to lower the electrical resistance value.

B. Deformation sensitive electroconductive sheet

The deformation sensitive electroconductive knitted or woven fabric capable of detecting stretch deformation, namely the stretch sensitive electroconductive knitted or woven fabric can preferably be laminated on its at least one surface with an elastomer to become greater in strength and elongation at break, excellent in stretchability and also markedly improved in durability in repeated stretch.

The elastomer as herein mentioned refers to all of the polymeric materials exhibiting rubbery elastic deformation, typically natural rubber, including also special synthetic rubbers such as urethane rubber, silicone rubber, fluorine rubber, etc., general synthetic rubbers such as styrene rubber, butadiene rubber, etc., plastic type rubbers such as polyisobutylene, etc. and polyesters exhibiting elastic deformation, and its shape may be a sheet or a film, or sometimes containing electroconductive fillers such as metal powder or metal fiber of nickel, copper, etc., carbon black, carbon fiber, etc. in an amount of 5 to 50 vol. % mixed therein to provide an anisotropic electroconductive elastomer which is conductive only in the thickness direction of the sheet or film or a pressure sensitive electroconductive elastomer. Particularly, when elastomers are to be laminated on both sides of the stretch sensitive electroconductive knitted or woven fabric, for ensuring electroconductivity between the stretch sensitive electroconductive knitted or woven fabric and the electrodes, the elastomer on at least one surface is required to be an anisotropic electroconductive elastomer, a pressure sensitive electroconductive elastomer or an elastomer causing insulation breakdown at a thickness of 3 $\mu$m or less. Next, the thickness of the elastomer (the total thickness of both elastomers in the case of the stretch sensitive electroconductive knitted or woven fabric having elastomers laminated on both surfaces) should more preferably be 5 $\mu$m to 1 mm, because the feeling (softness, flexibility) inherent in the knitted or woven fabric will not be lost, the strength and elongation at break is high with good stretchability and also excellent in durability in repeated stretch.

The stretchability as herein mentioned refers to the property of returning to the original length before stretch without residual strain within a short time after released from the stretched state, with the stretchability being better as the residual strain is smaller and the time required for returning is shorter. As for the durability in repeated stretch, it can be evaluated by measuring the stretch sensitive electroconduction curve (the curve showing the relationship between elongation and resistance value) after performing repeated stretch deformation of 0 to 20% for predetermined times (e.g. for 100,000 times), and comparing it with the stretch sensitive electroconduction curve before repeated stretch. As the difference between both is smaller, the durability in repeated stretch is more excellent.

If the thickness of the elastomer is less than 5 $\mu$m, the stretchability and the durability in repeated stretch will be inferior. On the other hand, in excess of 1 mm, soft inherent feeling in the knitted or woven fabric will be lost, and this is not preferable when using it as a sensor for the joint portion or body movement of a human body.

For adhesion between the stretch sensitive electroconductive knitted or woven fabric and the elastomer, there may be simply used the method in which the elastomer itself under adhesive state ("semi-dried" state where solvent still remains in the elastomer) is adhered and transferred, followed by drying, but it is also possible to use an ordinary adhesive. As the adhesive, there may be used typically epoxy type or amide type plastic adhesives conventionally used, also including all adhesives such as urethane type or latex type adhesives. The thickness of the adhesive layer may be preferably 20 $\mu$m or lower in aspect of adhesiveness or feeling, but it is not particularly limited. However, when an adhesive layer is interposed for adhesion between an anisotropic electroconductive elastomer sheet or a pressure sensitive electroconductive elastomer sheet and a stretch sensitive electroconductive knitted or woven fabric, it is required that the thickness of the adhesive layer should be a thickness to the extent of causing insulation breakdown of 3 $\mu$m or less, or that the contact resistance should be lowered by addition of an appropriate amount of electroconductive fillers as mentioned above.

Referring now to the drawings, examples of the stretch sensitive electroconductive sheet according to the present invention are to be described in detail.

Figure 6:
FIG. 6 to FIG. 11 are sectional views showing some examples of the stretch sensitive electroconductive sheet according to the present invention and FIG. 12 is a schematic illustration for explanation of the method for evaluation of feeling of the stretch sensitive electroconductive sheet.
Figure 7:
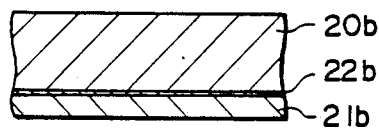
Figure 8:
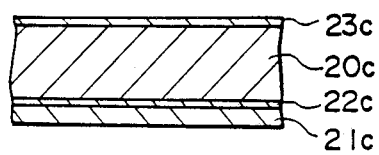

FIG. 6 shows a sectional view of an stretch sensitive electroconductive sheet having an electrically insulating elastomer laminated only on one surface (A type). FIG. 7 is a sectional view of an stretch sensitive electroconductive sheet according to the present invention having an electrically insulating elastomer laminated through an adhesive layer on one surface (B type). FIG. 8 is a sectional view of an stretch sensitive electroconductive sheet having an elastomer film with a thickness of 3 $\mu$m or less causing electrical insulation breakdown laminated on the other surface of the stretch sensitive electroconductive sheet as shown in FIG. 7 (C type).

Figure 9:
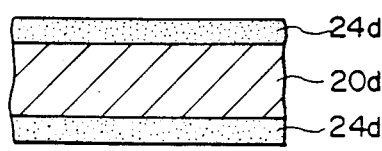
Figure 10:
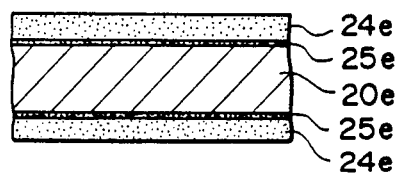
Figure 11:
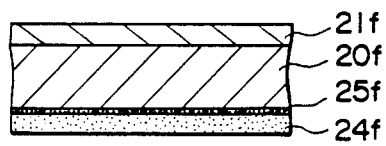

FIG. 9 is a sectional view of a stretch sensitive electroconductive sheet having anisotropic electroconductive elastomers or pressure sensitive electroconductive elastomers laminated on both surfaces of a stretch sensitive electroconductive knitted or woven fabric (D type). FIG. 10 is a sectional view of a stretch sensitive electroconductive sheet having an anisotropic electroconductive sheet or pressure sensitive electroconductive sheet laminated through an adhesive layer with a thickness of 3 $\mu$m or less causing electrical insulation breakdown (E type). FIG. 11 is a sectional view of a stretch sensitive electroconducive sheet having an electrically insulating elastomer on one surface and an anisotropic electroconductive sheet or a pressure sensitive electroconductive sheet through an adhesive layer with a thickness of 3 $\mu$m or less causing electrical insulation breakdown on the other surface (F type).

In FIGS. 6 through 11, 20a, 20b, 20c, 20d, 20e, 20f show stretch sensitive electroconductive knitted or woven fabrics, 21a, 21b, 21c, 21f electrically insulating elastomers, 22b, 22c adhesive layers, 23c elastomer films causing electrical insulation breakdown, 24d, 24e, 24f anisotropic electrocondutive elastomers or pressure sensitive electroconductive elastomers, and 25e, 25f adhesive layers causing electrical insulation breakdown, respectively.

In order to utilize the deformation sensitive electroconductive knitted or woven fabric detecting compression deformation, namely the pressure sensitive electroconductive knitted or woven fabric as the sensor, electrodes are provided on both surfaces of said knitted or woven fabric and the change in electrical resistance value between the above electrodes which occurs by compression deformation is detected.

In the prior art, as the sensor in which electrical resistance value is reduced by compression deformation, a sensor employing a pressure sensitive electroconductive rubber has been known. The pressure sensitive electroconductive rubber contains electroconductive particles such as metal particles or carbon black dispersed and mixed in a polymeric elastomer or a thermoplastic synthetic resin, and formed into a sheet so that the electrical resistance may be changed by the pressure applied on the sheet. However, this kind of a pressure sensitive electroconductive rubber is insufficient in uniformity of sensitivity due to nonuniform distribution of electroconductive particles. Also, since a large amount of electroconductive particles are mixed in the rubber, the rubber elasticity inherent in elastomer will be markedly impaired, thus involving disadvantages such that it becomes poor in durability and will readily be broken when applied with external force such as flexing or drawing.

The present invention has been accomplished under this background of the art, and its object resides in providing a pressure sensitive electroconductive sheet which has excellent pressure sensitive characteristics which are high in sensitivity and uniform, and yet has excellent mechanical characteristics and durability, thus being suitable as, for example, a device for pattern inputting.

When the above deformation sensitive electroconductive knitted or woven fabric of the present invention is laminated on at least one surface with an elastomer, the sheet will become preferably greater in strength and elongation of break, excellent in compression recovery and also markedly improved in durability in repeated compression. In this case, the thickness of the elastomer may be made as thin as 3 μm or less, or alternatively the elastomer may incorporate electroconductive fillers such as metal powder of nickel, copper, etc. or metal fiber, carbon black, carbon fiber, etc. in an appropriate amount of 5 to 50 vol % to be made an anisotropic electroconductive elastomer conductive only in the thickness direction of the sheet or film or a pressure sensitive electroconductive elastomer.

C. Deformation sensitive electroconductive device

(1) Stretch sensitive electroconductive device

The deformation sensitive electroconductive knitted or woven fabric of the present invention is characterized by being changed in electrical resistance at least in the direction in which deforming force is applied or at the deformed portion by one figure, and it can be utilized as the sensor or switch detecting deformation.

In order to utilize the deformation sensitive electroconductive knitted or woven fabric for detecting stretch deformation, namely the stretch sensitive electroconductive knitted or woven fabric, as the sensor, electrodes are provided on at least two sites on said knitted or woven fabric to grasp the deformation by changes in electrical characteristics such as electrical resistance between the above electrodes caused by stretch deformation. Such a sensor is called stretch sensitive electroconductive device in the present invention, which is to be explained in detail below.

In the prior art, a material in which electrical resistance is reduced by stretch deformation such as the stretch sensitive electroconductive sheet of the present invention has not widely been known, and therefore no sensor has been developed, which is capable of detecting presence of stretch of the subject to be measured, the amount of stretch and frequency of stretch and shrinkage by grasping the reduction in electrical resistance value caused by stretch deformation.

On the other hand, as the sensor utilizing the property of increasing in electrical resistance by stretch deformation, a strain gauge has been known. For example, electrical resistance value will be increased by drawing a fine metal wire such as of constantan, advance, nichrome, etc. However, since this kind of metal wire is very small in stretch (0.1% or less), the above-mentioned strain gauge can correspond only to a minute deformation of the subject to be measured, and not suitable for detection of great stretch deformation such as that at the flexing portion of elbow, knee, etc. of human body. Also, since this kind of metal wire is low in electrical resistance value, when used as a conventional switch by assembling in series to power source, the current will be passed under the steady state before stretch deformation and therefore it is not suitable for this field of uses.

As described above, the sensor known in the prior art can be used only for minute stretch deformation, or only for compression deformation. Accordingly, while a wide scope of application fields have been expected if there is a sensor capable of detecting stretch deformation, particularly stretch behaviors of the subject under a considerable amount of stretch deformation, namely presence of stretch, amount of stretch, frequency of stretch and shrinkage, there is presently no such sensor satisfying such performances.

The present invention is intended to provide a stretch sensitive electroconductive device to be used as the sensor capable of detecting the stretch deformation which is impossible by means of the sensor known in the prior art, particularly the stretch behaviors of the subject which undergoes a considerable amount of stretch deformation. In explanation of the stretch sensitive electroconductive device, the stretch sensitive electroconductive knitted or woven fabrics and the stretch sensitive electroconductive sheet having elastomers laminated on these are defined comprehensively as the stretch sensitive electroconductive sheet.

(i) Mounting of electrodes

As the method for providing electrodes on the stretch sensitive electroconductive sheet, there may be employed coating of an electroconductive adhesive, vacuum evaporation of a metal, grasping with commercially available alligator clips or compression or clamp-style terminals, the method of mounting electrode plates through an electroconductive resin layer, the method of mounting eyelets having electroconductivity, the method of mounting hooks having electroconductivity, etc. However, these methods are not limiting, but any method can be used, which is easy in connection to lead wires, low in contact resistance and capable of being applied with stretch stress.

Among them, by taking examples of (a) the method of mounting electrode plates through an electroconductive resin layer, (b) the method of mounting hooks having electroconductivity and (c) the method of mounting eyelets having electroconductivity, detailed descriptions are given below.

(a) The method of mounting electrodes through an electroconductive resin layer First, the electroconductive resins layer is a layer comprising an electroconductive resin, using a base material selected from conventionally used epoxy tube, acrylic type, ester type plastic adhesives, as well as urethane type and latex type adhesives, or heat-fusible polymers such as polyester type or polyamide type resins, in which appropriate amount electroconductive fillers within the range of from 5 to 50 vol % are incorporated. The electroconductive fillers as herein mentioned comprise metals such as nickel, copper, iron, aluminum, gold, silver or alloys thereof or electroconductive carbon, and their shapes may be powder or short fibers. The thickness of the electroconductive resin layer is required to be 1 μm or more, generally 2 μm or more and 50 μm or less preferably, although different depending on the use of the stretch sensitive electroconductive device, in aspect of adhesive force between the stretch sensitive electroconductive sheet and the electrode plates, contact resistance and cost, but this is not limiting of the present invention. If the thickness of the electroconductive resin layer is less than 1 μm, adhesive force is inferior. When the electroconductive resin is made of a heat-fusible polymer as the base material, it can more preferably be used in the form of a sheet or a film, which is excellent in operability.

Next, the electrode plate as mentioned in the present invention may include metal plates conventionally used as electrodes such as copper, aluminum, brass, stainless steel, etc. as well as electroconductive fabrics or electroconductive elastomer sheets endowed with electroconductivity by such means as metal plating, coating, flame spray coating or incorporation of electroconductive filaments. If the metal plate is embossed to unevenness, the adhesive force with the electroconductive resin layer can become higher and electrical insulation breakdown will readily occur, whereby the amount of the electroconductive fillers incorporated can be lowered. This is more preferable in aspect of cost and also because lowering in adhesive force with the electroconductive resin layer can be suppressed. Also, by selecting adequately the combination of the unevenness of the embossed metal plate with the thickness of the resin layer, electroconductivity can be obtained even if the resin layer has no electroconductivity.

FIGS. 13 through 16 show front views of the structures of four examples of the stretch sensitive electroconductive device according to the present invention.

Figure 13:
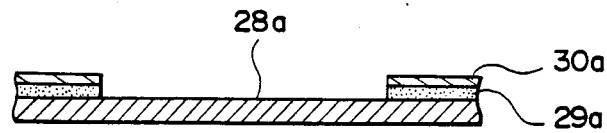
FIG. 13 to FIG. 16 are front views showing some examples of the stretch sensitive electroconductive device according to the present invention, FIG. 13 showing the case of employing a metal plate as the electrode plate, FIG. 14 the case of employing an embossed metal plate as the electrode plate, FIG. 15 the case of employing an electroconductive cloth as the electrode plate and FIG. 16 the case of having electrode plated equipped at both ends of both surfaces of the stretch sensitive electroconductive sheet.
Figure 14:
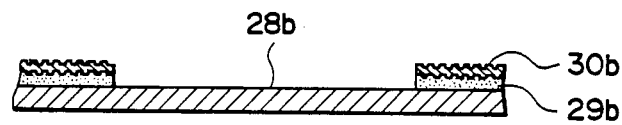
Figure 15:
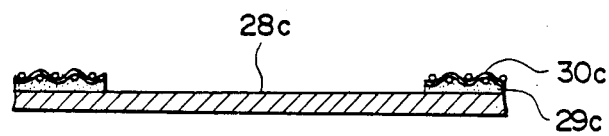
Figure 16:
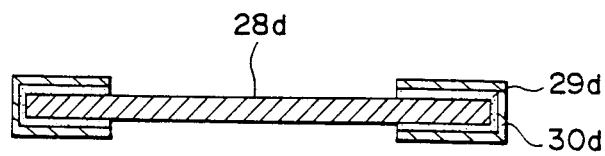

In these FIGS. 28a, 28b, 28c, 28d represent stretch sensitive electroconductive sheets, 29a, 29b, 29c, 29d electroconductive resin layers, and 30a, 30b, 30c, 30d, electrode plates. FIG. 13 shows a stretch sensitive electroconductive device using a metal plate as the electrode. FIG. 14 shows a stretch sensitive electrconductive device using an embossed metal plate as the electrode. FIG. 15 shows a stretch sensitive electroconductive device using an electroconductive fabric as the electrode plate. FIG. 16 represents a stretch sensitive electroconductive device equipped with electrode plates on both surfaces at both ends of the stretch sensitive electroconductive sheet.

(b) Method of mounting hooks having electroconductivity

Secondly, the hook having electroconductivity comprises convex portions on the male side and concave portions on the female side similarly as conventional hooks for clothing, and those convex and concave portions are engaged to give electroconductivity. The electroconductivity as herein mentioned means the state where contact resistance at the connected portion when the convex portion is engaged with the concave portion is 10Ω or less, and therefore the material of the hook is required to be a low electrical resistance material such as copper, brass, iron, aluminum, etc, (also inclusive of those applied with rust proof treatment, e.g. acrylic resin and plated with metal).

Referring now to the drawings, examples of the stretch sensitive electroconductive device according to the present invention are to be described in detail.

Figures 18A, 18B:
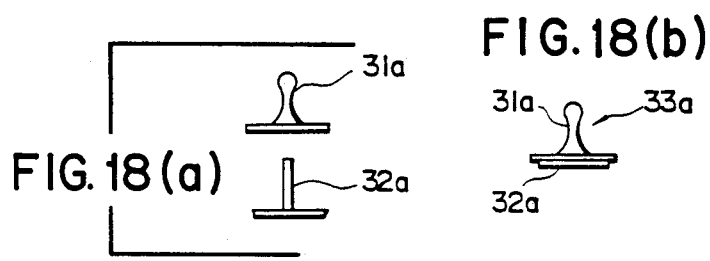
FIG. 18 is an illustration showing the constitution of the convex portion of the hook, (a) showing the state where tenon and fist are separated from each other and (b) the state where tenon and fist are engaged with each other to become integral.

The convex portions 33a of the hook of the stretch sensitive electroconductive device according to the present invention consists of the two constituent components called fist 31a (the convex portion of fist is hollow) and tenon 32a as shown in FIG. 18(a). By pushing both of the fist 31a and the tenon 32a against each other, with the stretch sensitive electroconductive sheet or the naked portion of the lead wire interposed therebetween, the fist 31a and the tenon 32a become firmly engaged to be made integral (FIG. 18(b)).

Figures 19A, 19B:
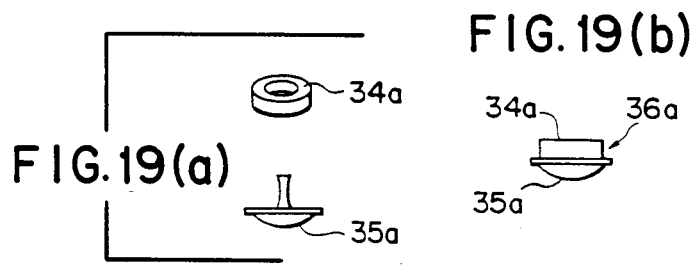
FIG. 19 is an illustration showing the constitution of the concave portion of the hook, (a) showing the state in which head and spring are separated from each other and (b) the state in which head and spring are engaged with each other to become integral.

On the other hand, similarly the concave portions 36a consists of the two constituent components called the head 35a and the spring 34a as shown in FIG. 19(a). By pushing both of the head 35a and the spring 34a against each other, with the naked portion of the lead wire or the stretch sensitive electroconductive sheet interposed therebetween, the head 35a and the spring 34a become firmly engaged to be made integral (FIG. 19(b)).

Figure 17:
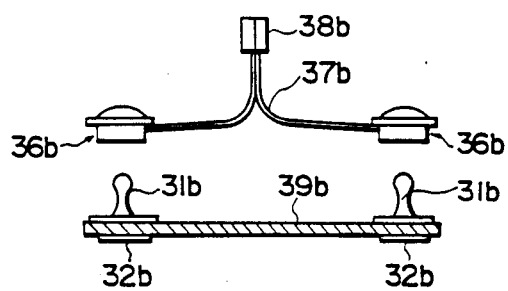
FIG. 17 is a front view showing an example of the stretch sensitive electroconductive device according to the present invention in which the convex portions and concave portions of a hook are apart from each other and lead wires are connected thereto.

FIG. 17 shows an example in which the convex portions are mounted by engaging the fist 31b and the tenon 32b on the convex portions of the hooks with an interval on the stretch sensitive electroconductive sheet 39b, while the naked portion of the lead wire 37b connected to the connector 38b is sandwiched between head and spring of the concave portions of the hooks. The fist 31b of the convex portion has a projected portion as shown in the Figure, while the concave portion has a hole in its center (see FIG. 19(a)), and therefore by engaging the convex portions with the concave portions, the lead wire 37b can be connected to the stretch sensitive electroconductive sheet 39b.

Figure 20:
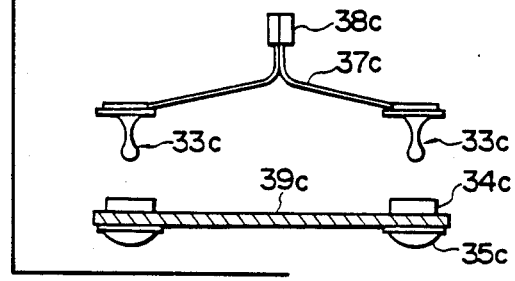
FIG. 20 is a front view showing another example of the stretch sensitive electroconductive device according to the present invention.

FIG. 20 shows an example, in which the concave portions are mounted by engaging the head 35c with the spring 34c of the convex portions of the hooks with an interval on the stretch sensitive electroconductive sheet 39c, while the naked portion of the lead wire 37c connected to the connector 38c is sandwiched between fist and tenon of the convex portions 33c of the hooks. Thus, by use of hooks for the terminals for connection of lead wires with the stretch sensitive electroconductive sheet, (1) connection to the lead wires can be easy, (2) the contact resistance is low and (3) stretch stress is imposed on the whole area sandwiched between the hooks to prevent local concentration of stress, whereby good durability to repeated stretch can be obtained.

In the case of using an stretch sensitive electroconductive device, the driving section for repeated stretch for applying stretch on the stretch sensitive electroconductive device may sometimes be connected to the above terminals for connection to the lead wires. In this case, if the above driving section for repeated stretch is made integral with the convex portions or the concave portions of the hook on the side having lead wires sandwiched therebetween, the stretch sensitive electroconductive sheet sandwiched between the concave portions or the convex portions on each reverse side is exchangeable by mounting to the lead wire side or detaching by one touch, and the device becomes more preferably compact. As the method for making integral the above driving section with the convex portions or the concave portions of the hooks having sandwiched lead wires therebetween, there may be employed, for example, the method in which the driving section are sandwiched together with the lead wires between the convex portions or the concave portions.

Figure 21:
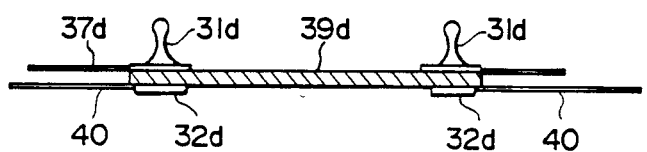
FIG. 21 is a front view showing an example in which the stretch sensitive electroconductive sheet is sandwiched on the convex portion of the hook at the driving section together with the lead wires.
Figure 22:
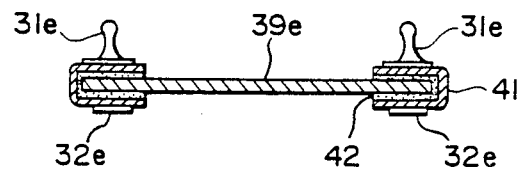
FIG. 22 is as front view showing another example of the stretch sensitive electroconductive device according to the present invention.

Also, it is more preferable to sandwich the stretch sensitive electroconductive sheet at the convex portions of the hooks, because connection to the lead wires can be easily obtained with alligator clips, etc. at the convex portions as the electrode terminals. When no exchange of the stretch sensitive electroconductive device is taken into consideration, it is of course possible to make the stretch sensitive electroconductive sheet alone or together with lead wires integral with the driving section by sandwiching with the convex portions or the concave portions. FIG. 21 shows the state in which the elongation electroconductive sheet 39d is sandwiched together with the lead wire 37d between the convex portions 31d and 32d of the hooks at the driving section 40. Further, for the purpose of lowering the contact resistance at the terminal portions for connection and increasing the mechanical strength, it is also possible to mount an electroconductive plate and an electroconductive resin layer interposed between the concave portions or convex portions of the hooks and the elongation electroconductive sheet. FIG. 22 shows a schematic illustration of an assembly in which an elongation electroconductive sheet 39e bonded on both sides at both ends with an electroconductive resin layer 42 and an electrode plate 41 is sandwiched between the convex portions 31e and 32e of the hooks.

(c) Method of mounting between eyelets having electroconductivity

Thirdly, the eyelet having electroconductivity has basically a guard opened outwardly with warping at one end of a cylinder (the cross-section is not necessarily a circle), similarly as conventional eyelets for clothings and industries, with the other end mechanically caulked (by means of a caulking machine) to form a guard so that an stretch sensitive electroconductive sheet can be sandwiched between the two guards. Its material is required to be an electroconductive material such as copper, brass, iron, aluminum, etc. (inclusive also of those applied with rust proof treatment e.g. acrylic resin and plated with metal). The maximum diameter of the cylinder should preferably be as small as possible, while the maximum diameter of the guard as large as possible, in order to make the contact resistance of the stretch sensitive electroconductive sheet lower.

Referring now to the drawing, an example of the stretch sensitive electroconductive device is to be described in detail below.

Figure 23:
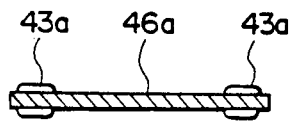
FIG. 23 is a front view showing an example of the stretch sensitive electroconductive device according to the present invention.
Figure 24A:
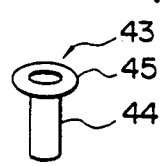
FIG. 24 is a perspective view showing the structure of an eyelet, (a) showing the shape before caulking and (b) that after caulking.
Figure 24B:
Figure 25:
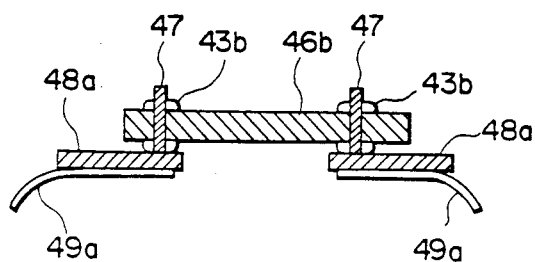
FIGS. 25, 26, 28 and 29 are front views showing embodiments of the stretch sensitive electroconductive device according to the present invention differing in mounting of lead wires, driving section thereon.

FIG. 24(a) is a schematic illustration of a cylindrical eyelet, 44 indicating the cylinder portion and 45 the guard. FIG. 24(b) shows the state when the cylinder portion 44 of the eyelet in FIG. 24(a) is caulked to be made into a shape of a guard. FIG. 23 is a front view schematically shown of an example of the stretch sensitive electroconductive device of the present invention obtained by sandwiching the stretch sensitive electroconductive sheet with the eyelets. As shown in the Figure, when the lead wire connecting terminal portions are formed by eyelets, they can contact the stretch sensitive electroconductive sheet at wide area (guard portion), whereby contact resistance becomes smaller and breaking of the sheet will occur with difficulty to give good resistance to repeated stretch. If the columnar electrode 47 within the cylinder of the eyelet 43b is mounted vertically on the driving section 48a which performs stretch deformation or deformation and movement accompanied with stretch, the stretch sensitive electroconductive device becomes attachable and detachable by one touch as shown in FIG. 25. Also, as shown in FIG. 26, if the naked portion of the lead wire 49b is sandwiched together with the stretch sensitive electroconductive sheet 46c by caulking with the eyelets, a more compact stretch sensitive electroconductive device integrated with the lead wire 49b is obtained, whereby mounting onto the driving section can be more preferably done with ease by utilization of the hole of the eyelet.

Figure 27:
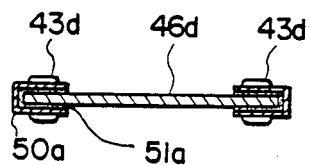
FIG. 27 is a front view showing another example of the stretch sensitive electroconductive device according to the present invention.

Further, as shown in FIG. 27, if an electroconductive electrode plate 50a and an electroconductive resin layer 51a are interposed between the eyelet 43d and the stretch sensitive electroconductive sheet 46d, contact resistance will be further lowered, whereby the mechanical strength against repeated stretch can more preferably be increased.

Figure 26:
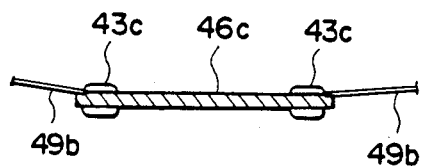
Figure 28:
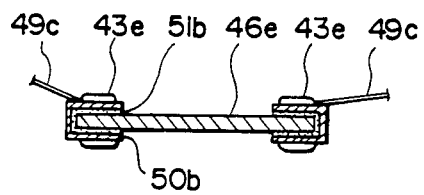

As shown in FIG. 28, if the naked portion of the lead wire 49c, the electroconductive electrode plate 50b and the electroconductive resin layer 51b are interposed between the eyelet 43e and the stretch sensitive electroconductive sheet 46e, a more compact stretch sensitive electroconductive device integrated with the lead wire can be obtained similarly as the stretch sensitive electroconductive device shown in FIG. 26, whereby mounting onto the driving section by utilization of the hole of the eyelet can be more preferably done with ease.

Figure 29:
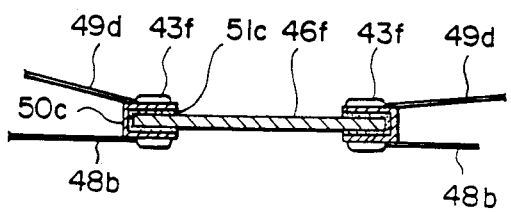

It is also of course possible to integrate the driving section together with sandwiching the stretch sensitive electroconductive sheet with eyelets. FIG. 29 shows an example of the stretch sensitive electroconductive sheet of the present invention, in which the lead wire 49d, the electrode plate 50c, the electroconductive resin layer 51c and the stretch sensitive electroconductive sheet 46f are integrated with the driving portion 48b with the eyelets 43f.

Figure 32:
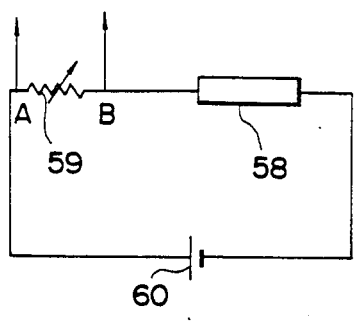
FIG. 32 is a circuit chart showing schematically the circuit in which the stretch sensitive electroconductive device is assembled.

The change in electrical resistance value which occurs when stretch deformation is applied on the above stretch sensitive electroconductive device can be detected easily with, for example, a tester. Also, when the change in electrical resistance value is to be detected as the change in voltage, it can be done by assembling the stretch sensitive electroconductive device in a simple circuit shown as an example in FIG. 32. In FIG. 32, 60 shows a power source, 58 an stretch sensitive electroconductive device and 59 a variable resistance, the output signals of voltage being obtained between the both terminals A, B. As the detector for detecting output signals of voltage, there may be employed a detector selected from the known detectors such as commercially available testers, synchroscopes or digital counters. The reduction in electrical resistance value can also be detected as the change in current.

(ii) Use of stretch sensitive electroconductive device

Next, the field of uses for which the stretch sensitive electroconductive device of the present invention can be used is to be explained. The stretch sensitive electroconductive device of the present invention can perform a considerable amount of stretch deformation easily and elastically, and therefore can be mounted on a subject for performing a considerable amount of stretch deformation in order to grasp its stretch behaviors. The considerable amount of stretch deformation as herein mentioned means greater elongation deformation as compared with stretch (0.1% or less) possessed by the known strain gauge, and its numerical value is not particularly limited. For example, it can be used as the sensor which can correspond flexibly to the motions of a human body (e.g. flexing of the joint portions at fingers, elbow, knee, etc., expansion and contraction of body by respiration, contraction of muscles, etc.). More concretely, it is useful as the sensor for medical purpose such as the respiration band detecting the frequency of respiration or the lung function testing device (the purpose is to manage respiration for new born child in apnea, particularly for pronatis, or to examine the lung function from lung capacity, flow rate (testing peripheral lung function by calculation from the gradient of the wave form) by recording respiration wave form). Also, it is useful as a pedometer, which is attached on elbow or knee for detecting the number of walking, a sensor for sport training to detect the level such as the number or the flexing degree of various training tools (accompanied with flexing and stretch) aimed at strengthening of muscles or shape-up, or as the finger switch to be mounted at the finger portion of a glove so as to correspond immediately to the movement of the finger. Further, it is useful as the rehabilitation tool for detecting the stretch degree or the flexing degree for the purpose of function restoration of the joint portion of a human body. Also, by fixing the both ends of the stretch sensitive electroconductive sheet and pushing the central portion to effect stretch change, it can be utilized as the tactile sensor for robot, no contact point switch for key board or handwriting input, seat sitting detecting sensor for confirmation of sitting by using at the seat portion, criminal preventive sensor (touch sensor) provided at window frame or handrail for prevention of crimes. Also, as an industrial sensor, it can be mounted at the rotational portion or flexing portion for industrial robot for directional sensor to detect the direction of the robot hand, etc., or mounted so as to surround the robot as a safety switch to prevent runaway of robot. Further, by placing a sheet (mat) of stretch sensitive electroconductive devices in the dangerous region, it can be used as the safety switch which stops the robot in emergency by detecting invasion of a worker. Also, it can be used as the sensor for detection of expansion degree of diaphragm or an expanded body or for hemomanometer. The stretch sensitive electroconductive device is not limited to the uses as mentioned above.

(iii) Method of setting elongation of stretch sensitive electroconductive device Next, it is necessary to set the stretch sensitive electroconductive device at a desired elongation. The desired elongation as herein mentioned differs depending on the purpose of use. For example, when the stretch sensitive electroconductive device is used as the switch device such as safety switch or criminal preventive switch, by setting the elongation just before the resistance value of the stretch sensitive electroconductive device begins to reduce from $10^6\Omega$ under insulating state (initial setting for example Point A in FIG. 34), a switch of good response without any erroneous actuation to slight stretch deformation can be obtained.

On the other hand, when a physical displacement such as elongation is to be detected from the change in resistance value of the stretch sensitive electroconductive device, said device can be set at the region where the relationship between the elongation (%) and the electric resistance value ($\Omega$) (logarithmic scale) of the stretch sensitive electroconductive device becomes approximately linear (FIG. 34, between BC) to enable measurement of the displacement amount with good precision.

Further, for preventing occurrence of changes in characteristics or destruction of the stretch sensitive electroconductive device by application of excessive tension or stretch on said device, it is necessary to set the maximum elongation at no higher than the limiting elongation (elongation at which stretch sensitive electroconductive characteristics can be maintained (D point in FIG. 34)).

As a means for setting the stretch sensitive electroconductive device at a desired elongation, there may be employed the method in which the indicator as a measure of elongation setting is mounted on said device itself or a body having assembled said device therein. The indicator as herein mentioned may be as material having higher modulus than the stretch sensitive electroconductive device, including papers, fibers, cloths (fabrics, unwoven fabrics, etc.), films and sheets comprising natural and synthetic polymers. The shape is not particularly limited, but an appearance approximate to the shape of the stretch sensitive electroconductive sheet is preferred.

By mounting the above indicator between the optional two electrodes of said device with sagging corresponding to the desired length of the stretch sensitive electroconductive device to be set, or by connecting to the body having assembled said device therein in a suitable manner, the stretch sensitive electroconductive device can be set at a desired elongation.

Referring now to the drawings, the product of the present invention is to be described in more detail.

Figure 34:
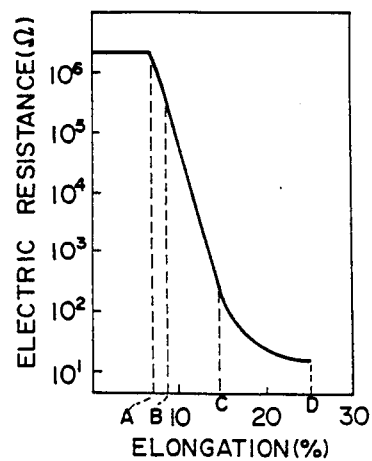
FIG. 34 is a graph showing the relationship between elongation (%) and electrical resistive value ($\Omega$) representing the elongation electroconductive characteristic of the elongation electroconductive device.
Figure 35A:
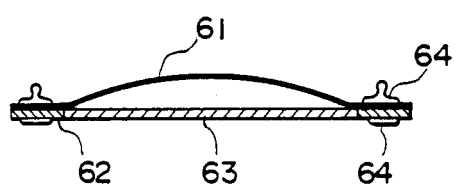
FIG. 35 to FIG. 38 are schematic illustrations of specific means devised to set the stretch sensitive electroconductive devices at desired elongations.
Figure 35B:
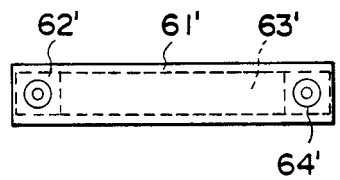
Figure 36:
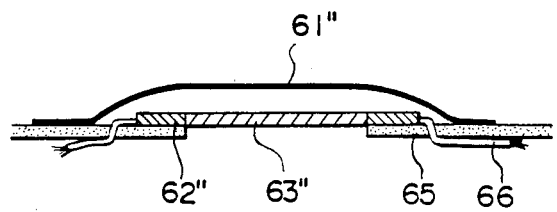

FIG. 35 (a) is an example in which an indicator having sagging corresponding to a desired elongation (point A in FIG. 34) of the stretch sensitive electroconductive device is connected to the two electrode terminals, and FIG. 35 (b) shows its plain view. FIG. 36 shows a side views of an example in which an indicator is mounted on a body capable of stretch deformation connected to the stretch sensitive electroconductive device. In FIGS. 35 (a), (b) and FIG. 36, 61, 61' and 61" show indicators, 62, 62' and 62" electrodes, 63, 63' and 63" stretch sensitive electroconductive sheets, 64 and 64' the convex portions of hooks, 65 a body capable of stretch deformation and 66 a lead wire. When the stretch sensitive electroconductive device is used for digital signal use such as a switch, the indicator is mounted with sagging corresponding to the elongation at which the electrical resistance of the stretch sensitive electroconductive device is changed from insulating state to conductive state, as shown in FIG. 35 (a) and FIG. 36. On the other hand, by stretching said device until there is no sagging of the indicator (initial setting) and connecting the electrical signal detecting circuit to said device, and at that point breaking the indicator or removing the indicator at the attachable and detachable portion such as hooks, it becomes possible to detect electrically even slight stretch deformation behavior with good sensitivity.

Next, if the sagging of the above indicator is set shorter than the length corresponding to the limiting elongation of the stretch sensitive electroconductive device, the device can be protected by the indicator even when an excessive force may be applied on said device, whereby lowering in stretch sensitive electroconductive characteristics or breaking can be suppressed. In this case, the indicator used may be one which is desined so as to be increased abruptly in modulus immediately before the limiting elongation of said device by making the initial modulus lower than the stretch sensitive electroconductive device such as a knitted fabric or a woven fabric comprising crimped fibers.

Figure 37:
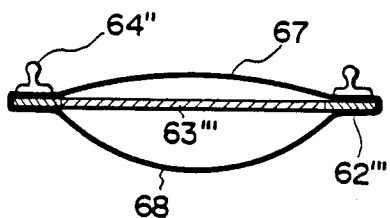
Figure 38:
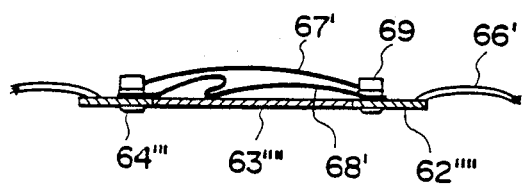

Further, by use of two or more indicators, the applied elongation region of the stretch sensitive electroconductive region may be selected as desired. FIG. 37 and FIG. 38 show schematically such examples. In these Figures, 67, 67' are indicators for initial setting, 68, 68' are indicators for maximum elongation setting (stoppers), and 69 a hook which enables attachment and detachment of the indicator. For example, by setting the initial setting indicator at the elongation B in FIG. 34 and the indicator for maximum setting at the elongation C in FIG. 34, the stretch sensitive electroconductive device can be used at the elongation region where the elongation (%) and the resistance value (Ω) (logarithmic scale) are in linear relationship, whereby measurement of displacement amount with good precision is rendered possible. On the other hand, by setting the former at the point A in FIG. 34 and the latter at the point D in FIG. 34, a switching device without erroneous actuation and high durability can be realized.

(iv) Method of insulating treatment of at least one surface of stretch sensitive electroconductive device Further, the stretch sensitive electroconductive device is required to be under electrically insulating condition on at least one surface. The greatest salient feature of the stretch sensitive electroconductive device resides in that the current becomes readily flowable on stretch, and at this time, when the subject to be tested or the body itself assembling the stretch sensitive electroconductive device therein has not been subjected to electrical insulating treatment, the stretch sensitive electroconductive device itself is required to be provided with a means for prevention of leak of current. Without this means, there may be undesirably caused electrical stimulation to the subject to be tested through leak of current or short circuit of the circuit having the stretch sensitive electroconductive device assembled therein or damages to the electronic parts.

As a means for preventing leak of current, all means may be applicable, including, for example the method in which the whole of the stretch sensitive electroconductive device with electrodes and lead wire is embedded with an electrically insulating polymeric elastomer by way of coating, dipping, spraying, etc.

The electrically insulating polymeric elastomer as herein mentioned is an elastic polymer having an elongation which does not interfere with stretch of the stretch sensitive electroconductive device, as exemplified by natural rubber and all synthetic polymeric elastomers such as urethane, silicone, fluorine rubber, butadiene rubber, etc. It is required that the electrical resistance value under the state having the stretch sensitive electroconductive device embedded therein obtained by the measuring method as described in Examples should be $10^6 \Omega$ or higher.

Also, there may be employed the method in which a film or sheet of the above electrically insulating polymeric elastomer is adhered onto at least one surface of the stretch sensitive electroconductive device. Further, as stretchable electrically insulating cloth (e.g. woven fabric, unwoven fabric or knitted fabric comprising crimped fibers or stretchable fibers) may be adhered or stitched (according to the method which does not interfere with elongation of the stretch sensitive electroconductive device such as zigzag chain stitch, etc.) onto at least one surface.

Further, for the stretch sensitive electroconductive device having electrodes and a lead wire mounted on the stretch sensitive electroconductive sheet bonded with an electrically insulating elastomer sheet on one surface, it is also possible to use the method in which all electrically insulating natural, synthetic polymer type or inorganic type adhesive tapes are bonded or adhesives (e.g. karaya rubber) are adhered only to the electrode portions.

There may also be employed means in which some of the means as described above are combined.

Referring now to the drawings, the stretch sensitive electroconductive device of the present invention is described in more detail.

Figure 39:
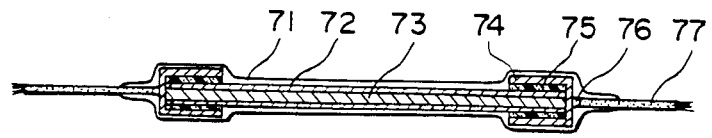
FIG. 39 to FIG. 43 show schematic illustrations of the stretch sensitive electroconductive devices showing that the whole surface of at least one surface of the stretch sensitive electronductive device is under insulating state.

FIG. 39 shown a conceptional illustration showing sectional view of the product of the present invention having the stretch sensitive electroconductive device embedded in an electrically insulating polymeric elastomer.

Figure 40:
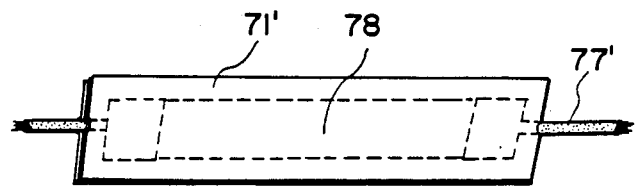

FIG. 40 shows as conceptional illustration showing the whole stretch sensitive electroconductive device of the product of the present invention bonded at both surfaces with two sheets of electrically insulating polymeric elastomer films.

Figure 41:
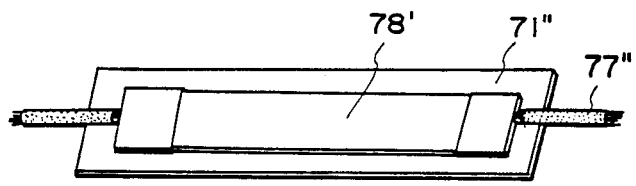

FIG. 41 shows a conceptional illustration of the stretch sensitive electroconductive device of the product of the present invention bonded at only one surface with an electrically insulating polymer elastomer film.

Figure 42:
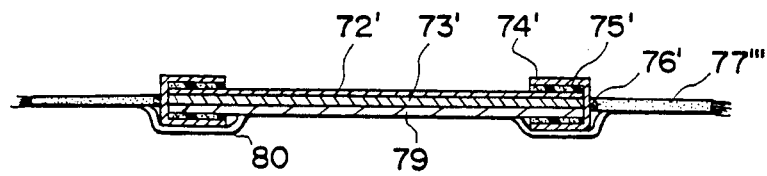

FIG. 42 shows a conceptional illustration of a sectional view of the product of the present invention bonded with an electrically insulating adhesive tape only at the electrode portions.

Figure 43:
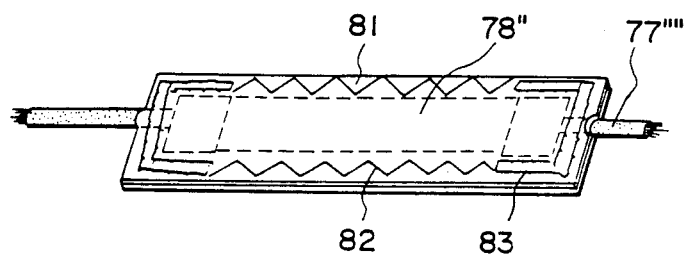

FIG. 43 is a conceptional illustration of the whole product of the present invention stitched with stretchable cloths at both surfaces of the stretch sensitive electroconductive device.

In these Figures, 71, 71', 71" are electrically insulating elastomers, 72, 72' insulation breakdown films of stretch sensitive electroconductive sheets, 73, 73' stretch sensitive electroconductive sheets (fabric), 74, 74' electrode plates, 74, 75' electroconductive resin layers, 76, 76' soldered portions, 77, 77', 77", 77''', 77'''' lead wires, 78, 78', 78" stretch sensitive electroconductive devices equipped with electrodes, 79 is an electrically insulating elastomer sheet, 80 an electrically insulating adhesive tape, 81 an electrically insulating stretchable cloth, 82 a fiber stithced by zigzag chain stitch and 83 a fiber stitched by machine.

(v) Method of mounting of deformation sensitive electroconductive device onto subject to be tested Next, the above stretch sensitive electroconductive device is required to be an stretch sensitive electroconductive device having a means for fixing onto a subject to be tested. Unless the stretch sensitive electroconductive device has a fixing means onto a subject to be tested which can fully utilize the stretch sensitive electroconductive characteristics, it cannot become a device capable of responding sharply to the stretch deformation of the subject to be tested.

As the fixing means onto the subject to be tested as described herein, all kinds of fixing means may be conceivable. However, first, the stretch sensitive electroconductive device is required to be used within the range which can exhibit its stretch sensitive electroconductive characteristics. This means that the three phenomena as mentioned below will not occur when the stretch sensitive electroconductive device is fixed onto the subject to be tested, but it should be understood that such phenomena are not limitative of the invention.

Figure 47A:
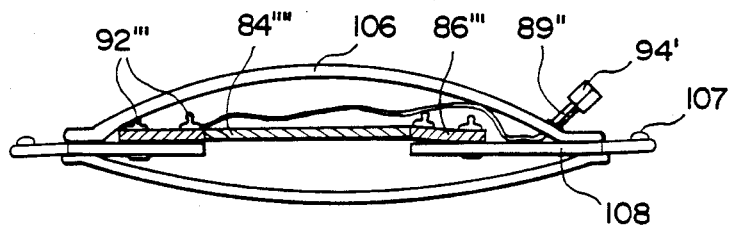
Figure 47B:
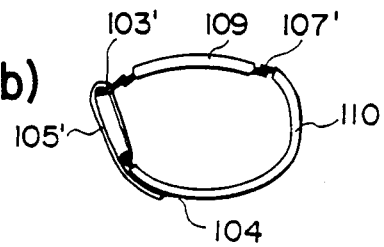

(1) destruction of said device by drawing too much (through damage of the stretch sensitive electroconductive sheet or breaking of electrodes);

(2) inability to detect minute stretching behavior due to too loose drawing; and (3) inability to detect stretching behavior due to stretch of the other region (e.g. the belt 110 in FIG. 47 (b)) than the detectable portion using said device.

For prevention of the phenomenon (1), care must be paid in handling, or it may be considered to mount a stopper which prevents elongation longer than the limiting value (indicator for maximum elongation setting). On the other hand, for prevention of the above phenomenon (2), it may be considered to mount previously the above indicator or to have the means to control minutely the extent of drawing. Finally, for prevention of the phenomenon (3), it may be considered to have a construction in which the region other than the sensitive portion (e.g. the belt 110 in FIG. 47 (b)) is made entirely unstretchable. By doing so, the stretch stress of the subject to be tested can be concentrated at the sensitive portion, whereby the stretch and contraction behaviors can be detected with good sensitivity.

For fixing the stretch sensitive electroconductive device onto the subject to be tested, it is necessary to avoid interference of the stretch behaviors or the behaviors accompanied with stretch. This is particularly important when the stress of the stretching movement is small, and if fixing is effected with a force greater than said stress, the movement of the subject to be tested will be impaired to make detection impossible.

For fixing the stretch sensitive electroconductive device onto a subject to be tested, there are essential requirements as mentioned above. As a method for satisfying these, there is the method, in which a sheet having stretchability (various rubber sheets, cloths mixed with Spandex) is incorporated. For example, when the deformation amount is small, the above stretchable sheet can be incorporated in parallel to the detecting portion (detecting unit) having the stretch sensitive electroconductive sheet incorporated therein. By doing so, fitness to the subject to be tested can be improved, and also mechanical characteristics such as stretchability or stress during deformation can be preferably controlled.

When the deformation amount is great, the above stretchable sheet can also be incorporated in series to said detecting unit. By doing so, said stretchable sheet can absorb the deformation amount more than the limiting elongation, whereby performance deterioration (such as damage) of the stretch sensitive electroconductive sheet of the detecting unit can more preferably be prevented.

Referring now to the drawings, the means for fixing onto the subject to be tested of the present invention is to be described in detail.

Figure 44A:
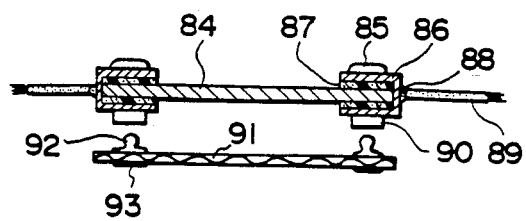
FIG. 44 to FIG. 47 show stretch sensitive electroconductive devices of the present invention which are made fixable onto a subject to be tested.
Figure 44B:
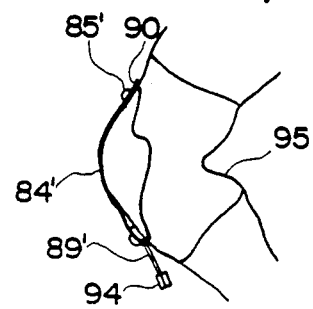

FIG. 44 (a) represents a sectional view of the stretch sensitive electroconductive device of the present invention utilizing a stretchable material as the fixing means.

In this Figure, the concave portions of the hooks are mounted on the side of the stretch sensitive electroconductive device and the convex portions of the hooks on the side of the subject to be tested or the side of the material to be mounted on the subject to be tested, but they can also be provided as contrary to such arrangements. The material to be mounted on the subject to be tested is constituted of a film or sheet or cloth (e.g. jersey), and it is required not to interfere with the stretch deformation of the subject to be tested. FIG. 44 (b) shows a conceptional illustration of an example in which a supporter having a stretch sensitive electroconductive device fixed by hooks is worn at the knee of a human body (pedometer or training analyzer).

Figure 45:
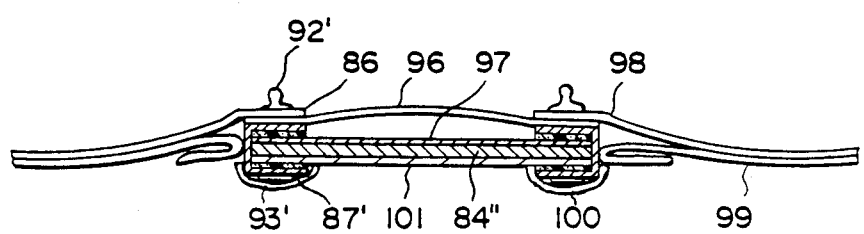
Figure 46:
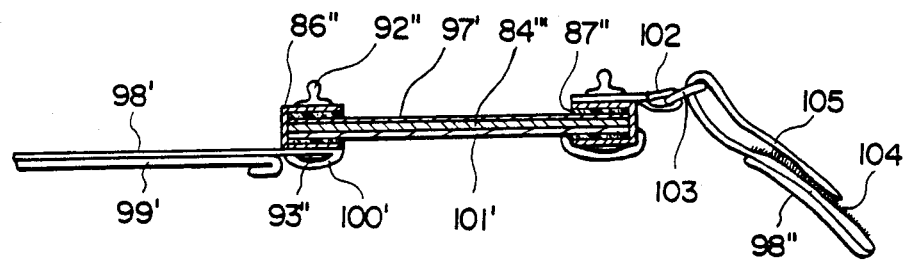

FIG. 45 shows as sectional view of a stretch sensitive electroconductive device having an adhesive tape used as the fixing means. Since an adhesive tape can be mounted at any desired site to be measured of the subject to be tested to grasp well the stretch behaviors with good sensitivity, it can be utilized widely for uses such as measurement of respiration function, muscle training, diaphragm, etc. Similarly, FIG. 46 is a stretch sensitive electroconductive device of the present invention utilizing an adhesive tape as the fixing means, and it is fixed with a minute controlling belt which can control stretch of said device even after adhesion to the subject to be tested. The minute controlling belt consists of a ring (103 in the Figure) and a belt, and a part of the belt can be fastened.

FIG. 47 (b) shows a conceptional illustration of the stretch sensitive electroconductive device of the present invention which can be fastened with a magic fastener by winding the belt around a subject to be tested having the stretch sensitive electroconductive device incorporated in a part of a belt. By making the belt readily fittable to the subject to be tested by use of a flexible fabric which cannot substantially stretched at the belt portion other than the sensor portion, stress can be concentrated at the sensor portion having the stretch sensitive electroconductive device incorporated therein, whereby detection can be more preferably done with good sensitivity.

This belt portion is provided with a portion capable of minute control of the extent of drawing and thus it can be more preferably fixed onto the subject to be tested with ease.

FIG. 47 (a) is a conceptional illustration of an enlarged sectional view of a part of the belt (sensor portion) having the stretch sensitive electroconductive device incorporated therein. In the Figure, 107 represents a joint portion connected to the belt.

In FIGS. 44 to 47, 84, 84', 84'', 84''', 84'''' are stretch sensitive electroconductive sheets (fabrics), 85, 85' heads of concave portions of hooks, 86, 86', 86'', 86''' electrode plates, 87, 87', 87'' electroconductive resin layers, 88 is a soldered portion, 89, 89', 89'' are lead wires, 90, springs of concave portions of hooks, 91 is a stretchable material, 92, 92', 92'', 92''' are fists of the convex portions of hooks, 93, 93', 93'' are tenons of the convex portions of hooks, 94, 94' connectors, 95 is a supporter, 96 an indicator for elongation setting, 97, 97' are insulation breakdown films, 98, 98' adhesive tapes, 99, 99' release papers, 100, 100' insulating adhesive tapes, 101, 101' insulating films, 102 is a material for fixing minute controlling rings, 103, 103' minute controlling rings, 104, 104' magic fasteners, 105, 105' minute controlling belts, 106 is a stretchable sheet or cloth, 107, 107' joint portions, 108 is a stand, 109 a sensor portion and 110 a belt portion.

(2) Pressure sensitive electroconductive device

A pressure sensitive electroconductive device for detecting compression can be obtained by providing electrodes on both surfaces on the pressure sensitive electroconductive sheet as described above. Electrodes are generally provided on both surfaces of the pressure sensitive electroconductive sheet, and the reduction in electrical resistance value of the pressure sensitive electroconductive sheet between the electrodes is effected by connecting the electrodes to a detecting circuit and detecting the change in electrical characteristics such as electrical resistance with a detector. These detecting circuits and detectors are known techniques, and any of them may be selected as desired depending on the use of the sensor.

The material of the electrodes as herein mentioned is required to comprise 100% of an electrically conductive material such as copper, brass, iron, aluminum, etc. (also inclusive of acrylic resins subjected to rust proof treatment and metal plating) or containing such materials in print wiring. Any desired shape may be available, but plates or sheets are convenient in handling.

The pressure sensitive electroconductive knitted or woven fabric of the present invention can be utilized in uses such as pressure-electrical signal converting device, connector, hand writing tablet, road sensor for discrimination of cars, various switches (explosion preventive switch, dust resistant or gas resistant switch, etc.), pressure sensor, pool touch board, various sensors for alarm, tactile sensor, etc.

EXAMPLES

The present invention is to be described in more detail by referring to the following examples of deformation sensitive electroconductive knitted or woven fabrics, elongation electroconductive sheets, elongation electroconductive devices according to the present invention, but it would be apparent that the present invention is not limited to the examples shown below. The methods for evaluation of the physical and electrical properties of the above knitted or woven fabrics, sheets and devices are explained elsewhere in these Examples.

EXAMPLE 1

A polyester filament taffeta fabric (warp 50d/24f, weft 75d/36f produced by Asahi Chemical Industry Co., Ltd.) was subjected to weight reduction work in an aqueous sodium hydroxide solution (80 g/l) (reduction ratio: 20%), sensitized in a bath with a weight ratio of $SnCl_2:HCl$ of 3:10, washed with water followed by dehydration, activated in a bath with a weight ratio of $PdCl_2:HCl$ of 1:15, washed with water followed by dehydration and then treated in a bath with a weight ratio of $NiCl.6H_2O:NaHPO_2.H_2O$:sodium citrate:$NH_4Cl$:ammonia water of 1:1:3:2:2 under the conditions of 90° C.×2 min. to prepare a Ni-plated taffeta fabric. This was cut into samples with sizes of 10 cm×10 cm, which were placed in a double cylinder type laminar flow generating device (inner cylinder rotating at higher speed, with inner diameter of the outer cylinder being 25 cm and the outer diameter of inner cylinder 10 cm) together with water, followed by peel-off treatment of the electroconductive substance at a rotational speed of inner cylinder of 200 rpm for 100 min., 200 min., 300 min., 600 min. and 24 hours, to obtain Samples Nos. 1, 2, 3, 4 and 5 of deformation sensitive electroconductive fabrics (products of the present invention). Also, the same treatments were conducted for 10 min., 20 min., 30 min. and 0 min. to obtain Samples Nos. 6, 7, 8 and 9 (Controls). Table 1 shows the changes in resistance value due to stretch deformation in the interplanar direction of the products of the present invention and Controls. Electrical resistance values when stretched were measured by cutting a sample to a piece with a 1 cm width and a 10 cm length in the bias direction, pinching the piece with two sheets of square copper plates with one side of 3 cm at both ends of 3 cm from each end to provide electrodes, which were mounted on a tensile testing machine, and values of electrical resistance by stretch in the bias direction were measured by means of Digital Multimeter produced by Takeda Riken K.K. at 20° C. and 65% R.H. On the other hand, electrical resistance at the intertwined portion was measured with the use of needle electrodes with $10^{-4}$ mm$^2$ at the tip end through the intertwined portion of the two fibers interposed therebetween. More concretely, while observing the intertwined portion of a sample with enlargement by a reflection type microscope, electrical resistance value was measured with needle electrodes between, for example 1 and 2, 3 and 4, in FIG. 1. In the case when its electrical resistance value was $10^6$ ohm or higher, the portion was judged to be under electrically insulating condition, while it was judged to be under electrically conductive condition when the resistance value was less than $10^6$ ohm. As for the electrical resistance value between the intertwined portions, electrical resistance between the adjacent two portions in the portions on the opposite sides of the intertwined portions was measured by means of needle electrodes under observation by microscope similarly as in the case of the intertwined portion.

As is apparently seen from Table 1, in Samples Nos. 1, 2, 3, 4 and 5 of the products of the present invention, electrical resistance values are lowered greatly correspondingly to the deformations. In contrast, in Samples Nos. 6, 7, 8 and 9 of Controls, resistance values are not substantially changed or very slightly, even if lowered.

TABLE 1

| | Sample No. | $k_1/k_2$ | $m_1/m_2$ | Change in electrical resistance value in the stretched direction within plane ($\Omega$) | | | | | |
|---|---|---|---|---|---|---|---|---|---|
| | | | | 0% | 2% | 5% | 10% | 15% | 20% |
| Present invention | 1 | 3/17 | 1/9 | 120 | 100 | 90 | 50 | 13 | 8 |
| | 2 | 7/13 | 3/7 | $1.3 \times 10^4$ | $0.8 \times 10^4$ | $1 \times 10^3$ | $2 \times 10^2$ | 30 | 10 |
| | 3 | 4/1 | 4/1 | $>4.5 \times 10^6$ | $>4.5 \times 10^6$ | $5 \times 10^5$ | $1 \times 10^3$ | 200 | 80 |
| | 4 | 19/1 | 19/1 | $>4.5 \times 10^6$ | $>4.5 \times 10^6$ | $7 \times 10^5$ | $5 \times 10^3$ | 600 | 100 |
| | 5 | $\infty$ | $\infty$ | $>4.5 \times 10^6$ | $>4.5 \times 10^6$ | $>4.5 \times 10^6$ | $>4.5 \times 10^6$ | $9 \times 10^5$ | $5 \times 10^4$ |
| Control | 6 | 1/19 | 1/19 | 8 | 8 | 7 | 7 | 6 | 5 |
| | 7 | 1/9 | 1/19 | 20 | 15 | 8 | 8 | 8 | 7 |
| | 8 | 1/19 | 3/22 | 30 | 20 | 10 | 8 | 8 | 6 |
| | 9 | 0 | 0 | 2 | 2 | 5 | 5 | 5 | 5 |

$k_1/k_2$: Of all the intertwined portions in unit area, ratio of the number $k_1$ of the intertwined portions under electrically insulating condition to the number $k_2$ of the intertwined portions under electroconductive.

$m_1/m_2$: In unit length, of all the portions between adjacent intertwined portions, ratio of the number $m_1$ of the portions between the intertwined portions under electrically insulating condition to the number $m_2$ of the portions between the intertwined portions under electrically conductive state.

EXAMPLE 2

Using a polyester filament (100d/50f) produced by Asahi Chemical Industry Co., Ltd., a tubler knitted fabric was knitted by means of a tubler knitting machine with a 3.5 inch diameter and 300 needles. This was subjected to the weight reduction treatment (reduction ratio: 18%), and subsequently to the Ni plating treatment under the same conditions as in Example 1. The knitted fabric was deknitted and coned up. By use of the electroconductive fibers thus obtained, fabrics with rib stitch, plain and half cardigan texture were prepared by means of a flat knitting machine of 14 GG to provide deformation sensitive electroconductive knitted fabrics. The knitted fabric (1 inch width) was pinched at both ends in the course direction with electrodes, and electrical resistances (elongation conductivities) on elongation of 20, 40, 60, 80 and 100% were represented in terms of $\Omega$ and shown in Table 2.

TABLE 2

| Stitch texture | Elongation | | | | | |
|---|---|---|---|---|---|---|
| | 0% | 20% | 40% | 60% | 80% | 100% |
| Rib stitch | 400 $\Omega$ | 420 $\Omega$ | 250 $\Omega$ | 140 $\Omega$ | 100 $\Omega$ | 30 $\Omega$ |
| Plain stitch | 500 $\Omega$ | 400 $\Omega$ | 110 $\Omega$ | 20 $\Omega$ | 11 $\Omega$ | 5 $\Omega$ |
| Half cardigan stitch | 1200 $\Omega$ | 1100 $\Omega$ | 820 $\Omega$ | 350 $\Omega$ | 150 $\Omega$ | 15 $\Omega$ |

EXAMPLE 3

A crimped polyester filament of 50d/24f (A) and a raw polyester filament of 75d/36f (B) produced by Asahi Chemical Industry Co., Ltd. were subjected in hanks to weight reduction work in an aqueous sodium hydroxide solution (60 g/l) at 100° C. (reduction ratio: 20%), sensitized in a bath with a weight ratio of $SnCl_2:HCl$ of 3:10, washed with water followed by dehydration, activated in a bath with a weight ratio of $PdCl_2:HCl$ of 1:15, washed with water followed by dehydration and then treated in a bath with a weight ratio of $NiCl_2.6H_2O:NaHPO_2.H_2O$:sodium citrate:$NH_4Cl$:ammonia water of 1:1:3:2:2 under the conditions of 80° C.×2 min. to prepare two kinds of Ni-plated polyester filaments (A' and B') (weight gains by plating were both 18%).

On the other hand, after scouring of the spun fibers 3/30Nm (C) and 2/52Nm (D) Cashmilon (acrylic fiber produced by Asahi Chemical Industry Co., Ltd.), they were subjected to sensitization and activation in the same manner as described above, followed by Ni plating (C' and D') (plating ratio: 20%).

Plain weave fabrics 1 to 8 were prepared by combining electroconductive fibers of (A'), (B'), (C') and (D') and insulating fibers as warp or weft, and made into bias cut stretch sensitive electroconductive fabrics (Samples No. 7 and No. 8 are not cut in the bias direction but they are Controls cut in the longitudinal direction and the lateral direction, respectively).

As for Samples No. 4 through No. 8, the intertwined portions were adhered between warp and weft (weft was coated with a polyamide type resin of low melting point and adhered to warp by hot press).

Measurement of electrical resistance values ($\Omega$) was conducted by pinching the sample with square copper plates with one side of 3 cm at 1 cm from the both ends, respectively, and mounting it on a tensile testing machine.

As can be seen from Table 3, Sample Nos. 1, 2, 3, 4, 5 and 6 are lowered greatly in electrical resistance value corresponding to stretch deformations. In contrast, Samples Nos. 7 and 8 of Controls are not cut in the bias direction and therefore not substantially lowered in resistance value by deformations.

TABLE 3

| | Sample No. | Warp | | Weft | | Cutting slanted angle | Reading of electrical resistance value in the stretched direction | | | |
|---|---|---|---|---|---|---|---|---|---|---|
| | | Kind | Density | Kind | Density | | Before stretch | 5% elongation | 10% elongation | 20% elongation |
| Present invention | 1 | A' | 110/inch | Polyester 50d/24f | 40/inch | 45° | $>4.5 \times 10^6$ | $1 \times 10^6$ | $6 \times 10^4$ | 500 |
| | 2 | B' | 60/inch | Polyester 50d/24f | 40/inch | 45° | $>4.5 \times 10^6$ | $3 \times 10^6$ | $1 \times 10^5$ | $2 \times 10^3$ |
| | 3 | Polyester 75d/36f | 50/inch | C' | 28/inch | 50° | $>4.5 \times 10^6$ | $3 \times 10^5$ | $2 \times 10^2$ | 80 |
| | 4 | D' | 50/inch | Polyester 250d/1f | 18/inch | 30° | $>4.5 \times 10^6$ | $3 \times 10^5$ | $1 \times 10^3$ | 50 |
| | 5 | " | " | Polyester 250d/1f | " | 45° | $>4.5 \times 10^6$ | $3 \times 10^5$ | $5 \times 10^3$ | 100 |
| | 6 | " | " | Polyester 250d/1f | " | 60° | $>4.5 \times 10^6$ | $5 \times 10^5$ | $1 \times 10^4$ | 600 |
| Control | 7 | " | " | Polyester 250d/1f | " | 0° | 10 | 90 | 120 | (Broken) |

TABLE 3-continued

| Sample No. | Warp Kind | Warp Density | Weft Kind | Weft Density | Cutting slanted angle | Reading of electrical resistance value in the stretched direction | | | |
|---|---|---|---|---|---|---|---|---|---|
| | | | | | | Before stretch | 5% elongation | 10% elongation | 20% elongation |
| 8 | " | " | Polyester 250d/1f | " | 90° | >4.5 × 10⁶ | >4.5 × 10⁶ | >4.5 × 10⁶ | (Broken) |

Cutting slanted angle: Cutting angle relative to warp

EXAMPLE 4

A commercially available urethane type elastomer resin (solvent DMF, solid content 10 wt. %) was coated onto a release paper to a gauge (thickness) of 130 μm, followed by drying under the conditions of 100° C.×3 min. Under the state still wet, hot adhesion and transfer was effected on one surface of the deformation sensitive electroconductive fabric of Sample No. 3 in Example 1 at 110° C. under a pressure of 4 kg/cm². Then, after drying under the conditions of 100° C.×30 min., a stretch sensitive electroconductive sheet of Sample No. 1 of A type as shown in FIG. 6 with the elastomer sheet thickness of 10 μm was prepared. Also, after coating a release paper applied with a coating of a urethane type sheet with a thickness of 5 μm with a commercially available urethane type adhesive (solvent DMF, solid content 10 wt.%) to a gauge of 50 μm, the coated product was dried under the conditions of 100° C.×5 min., followed by hot adhesion of a 5 μm thick urethane type sheet through an adhesive layer with a thickness of 2 μm on one surface of an stretch sensitive electroconductive fabric in shape of a sheet at 110° C. under a pressure of 4 kg/cm² and drying under the conditions of 130° C.×30 min., to prepare a stretch sensitive electroconductive sheet of Sample No. 2 of B type as shown in FIG. 7. Further, on one surface of the stretch sensitive electroconductive fabric shaped in a sheet, an insulation breakdown film with a thickness of 2 μm was transferred to a 50 μm gauge under the same conditions as Sample No. 1, and a urethane type elastomer sheet with a thickness of 5 μm was transferred onto the other surface through an adhesive layer in the same manner as Sample No. 2 to prepare an stretch sensitive electroconductive sheet of Sample No. 3 of C type as shown in FIG. 8.

Next, the commercially available urethane type elastomer resin as previously described was mixed with 20 vol. % of commercially available copper powder (particle size: 5-10 μm) to prepare an anisotropic electroconductive sheet and, under the same conditions as Sample No. 1, the anisotropic electroconductive sheets with a thickness of 10 μm (with contact resistance value in the thickness direction of 1Ω or less) were transferred onto both surfaces of the stretch sensitive electroconductive fabric shaped in a sheet to obtain a stretch sensitive electroconductive sheet of Sample No. 4 of D type as shown in FIG. 9. Further, on the release paper coated previously with an anisotropic electroconductive urethane sheet with a thickness of 10 μm mixed with 15 wt. % of copper powder, the above urethane type adhesive layer was applied by coating under the same conditions as Sample No. 2, and anisotropic electroconductive sheets with a thickness of 10 μm were adhered through an adhesive layer with a thickness of 2 μm on both surfaces of the stretch sensitive electroconductive fabric, to prepare an stretch sensitive electroconductive sheet of Sample No. 5 of E type as shown in FIG. 10. Further, on the other surface of Sample No. 1, the anisotropic electroconductive sheet was adhered through an adhesive layer with a thickness of 2 μm to prepare a stretch sensitive electroconductive sheet of Sample No. 6 of F type as shown in FIG. 11. Also, by transferring a urethane type elastomer sheet with a thickness of 1100 μm on one surface through an adhesive layer, and further a urethane type elastomer film causing electrical insulation breakdown with a thickness of 2 μm on the other surface under the same conditions as Sample No. 3, an stretch sensitive electroconductive sheet of Sample No. 7 as shown in FIG. 8 was prepared. Also, as Controls, there were prepared a stretch sensitive electroconductive fabric having no elastomer laminated thereon at all (Sample No. 8) and Sample No. 9 having film layers with a thickness of 4 μm or more free from electrical insulation breakdown formed by coating both a release paper coated with a urethane type elastomer sheet with a thickness of 5 μm and a release paper applied with no coating with a urethane type adhesive (solvent DMF, solid content 10 wt. %) by a roll coater to a 70 μm gauge, dried under the condition of 100° C.×5 min followed by transfer of respective coated products (at 110° C. under a pressure of 4 kg/cm²) onto both surfaces of the stretch sensitive electroconductive fabric.

Further, after coating a release paper with the urethane type adhesive as previously described by a roll coater to a 50 μm gauge, elastomer films with a thickness of 2 μm were transferred on both surfaces of the stretch sensitive electroconductive fabric to prepare Sample No. 10 of Control.

Figure 12:

Next, the stretch sensitive electroconductive sheets of the present invention of Samples Nos. 1 to 7 and Controls of Sample Nos. 8 to 10 were cut into a size of 1 cm in width and 5 cm in length in the bias direction of fabric, and measurements were conducted and compared for residual strain, durability to repeated stretch and feeling. The results are shown in Table 4. Residual strain was measured by sandwiching the sample at 1 cm length of both ends, stretching to 20% by a tensile testing machine (Tensilon produced by Toyo Baldwin Co. Ltd.), then returning to the original length and reading the elongation where S-S curve stands up when stretched again 10 seconds later. On the other hand, durability to repeated stretch was measured by means of an stretch repetition testing machine (Dematcher produced by Daiei Kagaku) by repeating stretch of a sample of 4 cm at elongation from 0 to 20% at a rate of 100 times/min. for 500,000 times, measuring electrical resistances (Ω) on elongation of 0, 10 and 20% and comparing with those before the repetition test. Feeling is evaluated by the minimum length at which the end of a sample 27 with 10 cm length can be turned up as shown in FIG. 12 (namely, the minimum length at which the folded state cannot be maintained but turned back to the original state, the length of the shadowed portion 26). The standards for evaluation are "very soft" for less than 3 cm, "soft" for 3 cm to less than 5 cm, "hard" for 5 cm to less than 6 cm and "very hard" for 6 cm or more.

Tensile strength and elongation

Tensile strength and elongation was measured by means of the above tensile testing machine by drawing a test strip of 1 cm×5 cm at a speed of 100%/min.

The stretch sensitive electroconductivity was measured by pinching the sample with two sheets of square copper plates with one side of 3 cm at 1 cm from both ends to provide electrodes, mounting it on the tensile testing machine and measuring the electrical resistance ($\Omega$) by elongation in the bias direction by means of Digital Multimeter produced by Taketa Riken K.K.

a strip of 1 cm width×5 cm length, which was then equipped with metal hooks at its both ends to obtain a stretch sensitive electroconductive device.

Figure 30:
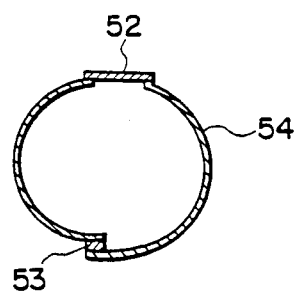
FIG. 30 is a plan view showing the respiration band prepared by use of the stretch sensitive electroconductive device according to the present invention.

By use of the thus obtained stretch sensitive electroconductive device, a respiration band as shown in FIG. 30 was prepared. That is, as belt 54 made of a nylon fabric was engaged at both ends of the stretch sensitive electroconductive device 52 with hooks, and by engaging the ends of the belt 54 made of nylon fabric to each other with a magic tape 53, the respiration band was arranged at the abdominal or chest portion of a human body. Thereafter, to the connecting terminal portions of the stretch sensitive electroconductive device 52 of the respiration band was connected a circuit for applying

TABLE 4

| | Sample No. | Structure (type) | Total thickness of elastomer (μm) | Residual strain 10 sec. after 20% elongation | Stretch sensitive electroconductivity [electrical resistance ($\Omega$)] before 0←→20% repeated stretch | | | Stretch sensitive electroconductivity [electrical resistance ($\Omega$)] after 0←→20% repeated stretch (500,000 times) | | | Feeling | Strength at break (kg/cm width) | Elongation at break (%) |
|---|---|---|---|---|---|---|---|---|---|---|---|---|---|
| | | | | | 0% | 10% | 20% | 0% | 10% | 20% | | | |
| Present invention | 1 | A | 10 | 0.3% | >4.5 × 10$^6$ | 1 × 10$^3$ | 80 | >4.5 × 10$^6$ | 1.5 × 10$^3$ | 80 | Very soft | 8 | 55 |
| | 2 | B | 7 | 0.4% | >4.5 × 10$^6$ | 1 × 10$^3$ | 80 | >4.5 × 10$^6$ | 1.5 × 10$^3$ | 80 | Very soft | 6 | 55 |
| | 3 | C | 9 | 0.3% | >4.5 × 10$^6$ | 1 × 10$^3$ | 80 | >4.5 × 10$^6$ | 1.3 × 10$^3$ | 80 | Very soft | 7.5 | 60 |
| | 4 | D | 20 | 0.2% | >4.5 × 10$^6$ | 1 × 10$^3$ | 80 | >4.5 × 10$^6$ | 1.0 × 10$^3$ | 80 | Soft | 10 | 55 |
| | 5 | E | 24 | 0.1% | >4.5 × 10$^6$ | 1.5 × 10$^3$ | 90 | >4.5 × 10$^6$ | 1.5 × 10$^3$ | 90 | " | 12 | 60 |
| | 6 | F | 22 | 0.1% | >4.5 × 10$^6$ | 2 × 10$^3$ | 100 | >4.5 × 10$^6$ | 2 × 10$^3$ | 100 | " | 13 | 65 |
| | 7 | C | 1104 | 0% | >4.5 × 10$^6$ | 5 × 10$^3$ | 200 | >4.5 × 10$^6$ | 5 × 10$^3$ | 200 | Hard | 15 | 65 |
| Control | 8 | Non Elastomer | 0 | 10% | >4.5 × 10$^6$ | 1 × 10$^3$ | 80 | >4.5 × 10$^6$ | 5 × 10$^4$ | 5 × 10$^2$ | Very soft | 4 | 40 |
| | 9 | — | 18 | 0.2% | >4.5 × 10$^6$ | >4.5 × 10$^6$ | >4.5 × 10$^6$ | — | — | — | Soft | 7 | 55 |
| | 10 | — | 4 | 2.5% | >4.5 × 10$^6$ | 1 × 10$^3$ | 80 | >4.5 × 10$^6$ | 4 × 10$^4$ | 3 × 10$^2$ | Very soft | 5 | 50 |

From Table 4, it can be seen that Samples No. 1 to 7 of the stretch sensitive electroconductive sheets of the present invention are markedly smaller in residual strain, higher in tenacity at break and elongation at break, and substantially without deterioration of stretch sensitive electroconductivity even after repeated stretch for 500000 times as compared with Sample No. 8 of Control which is not reinforced with an elastomer. The Sample No. 10 of Control with thin elastomer sheets for reinforcement with the total thicknesses of both surfaces of less than 5 μm is inferior in durability to repeated stretch, although improvement with respect to tenacity and elongation at break can slightly be recognized. Also, in Sample No. 9 of Control with a thickness which does not cause electrical insulation breakdown for each of the elastomer sheets laminated on both surfaces (in excess of 3 μm), stretch sensitive electroconductivity property is lost since no conduction to electrodes can be obtained. Sample No. 7 of the stretch sensitive electroconductive sheet of the present invention has an elastomer thickness in excess of 1 mm and therefore rigid in feeling to be unsuitable for use in detection of joint portion or body action of human body, but extremely high in tenacity at break and elongation at break, and hence it can be understood to be suitable for the field in which durability and mechanical strength are demanded, such as switch devices for industrial robots.

EXAMPLE 5

The stretch sensitive electroconductive sheet of Sample No. 3 in Example 4 was cut in the bias direction into voltage with a cell of 5 volt with connection of a variable resistance set at 500 k$\Omega$ in series (see FIG. 32).

Figure 33:
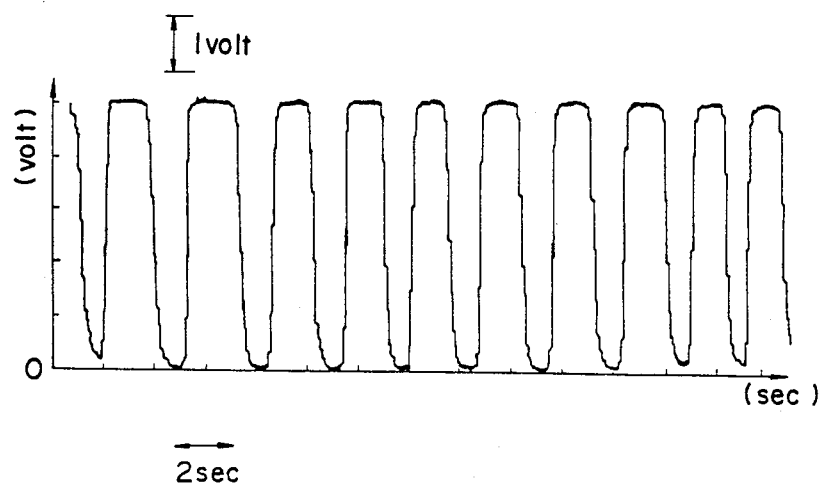
FIG. 33 is a graph showing the respiration wave form measured by the respiration band.

With respiration of the human body, the electrical resistance value of the stretch sensitive electroconductive sheet between the connecting terminals of the stretch sensitive electroconductive device incorporated in the aspiration band was changed, whereby the voltage generated between the both terminals A and B of the variable resistance 59 was changed. By detecting this voltage with a detector, a respiration wave form as shown in FIG. 33 was obtained, and the respiration number and the respiration frequency could be grasped from the respiration wave form.

EXAMPLE 6

Figure 31:
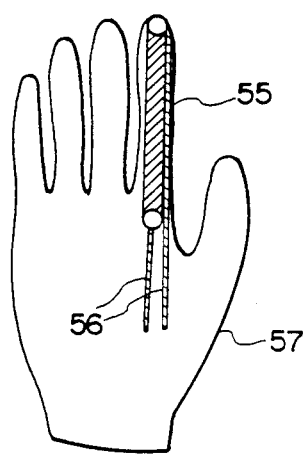
FIG. 31 is a front view showing the case of employing the stretch sensitive electroconductive device according to the present invention as the finger switch.

By use of the stretch sensitive electroconductive device used in Example 5, a finger switch as shown in FIG. 31 was prepared. That is, the stretch sensitive electroconductive device 55 was mounted by the hooks at the tip portion and the third joint portion of the finger of a commercially available leather glove 57. The stretch sensitive electroconductive device 55 was assembled in a circuit as shown in FIG. 32 (cell 5 volt, variable resistance 500 k$\Omega$) through lead wires, and the terminals A, B of Total counter H7EC produced by Omron (actuated at 5 volt or less) were connected thereto.

As a result, a finger switch not found in the prior art capable of counting corresponding to bending and stretching of a finger could be obtained.

EXAMPLE 7

A commercially available urethane type elastomer resin (solvent DMF, solid content 10 wt. %) was coated onto a release paper to a gauge (thickness) of 90 μm, then dried at 100° C. for 3 minutes and, under semi-dried state, transferred by hot adhesion onto both surfaces of the stretch sensitive electroconductive fabric of Sample No. 3 in Example 1 at 110° C. under a pressure of 4 kg/cm$^2$, followed by drying at 100° C. for 30 minutes, to obtain an stretch sensitive electroconductive sheet.

Next, this sheet was cut in the bias direction into a strip of 1 cm width×5 cm length, connected with copper plates with a thickness of 40 μm on both surfaces at the portions 1 cm apart from the both ends with an adhesive to prepare an stretch sensitive electroconductive device which was lowered in resistance value from $4.5 \times 10^6 \Omega$ to $2.0 \times 10^2 \Omega$ by 15% elongation. The stretch sensitive electroconductive characteristics of this device are shown in FIG. 34, which shows an elongation A of 7% just before the resistance value changes from insulating state to conductive state, a region of B-C of 8.5 to 15% where elongation and resistance value maintain a linear relationship and a limiting elongation D of 25%. Between the two electrode portions of the above device was mounted a paraffin paper of 1.2 cm width×5.21 cm length with hooks made of a metal with sagging corresponding to the elongation A to prepare a stretch sensitive electroconductive device (Sample No. 1) of the product of the present invention capable of initial setting (substantial length 3.21 cm) (see FIG. 35(a), (b)). Next, between the both ends of the above stretch sensitive electroconductive device, a paraffin paper was connected with sagging corresponding to the elongation B on the front side, while a polyester filament fabric (70d/24f) corresponding to the elongation C on the back side with hooks, respectively, to prepare a stretch sensitive electroconductive device (Sample No. 2) of the present invention in which elongation and electrical resistance (logarithmic scale) are in linear relationship (see FIG. 37). Also, between the electrodes at both ends of the above stretch sensitive electroconductive device, a polyester filament fabric (70d/24f) was fixed with the male of a hooks with sagging corresponding to the limiting stretch sensitive D to prepare a stretch sensitive electroconductive device of the present invention (Sample No. 3) having an indicator attachable and detachable from the above male hooks comprising a polyester filament fabric (70d/24f) sandwiched between female of hooks at both ends with a distance between the centers of both hooks longer by the length corresponding to the initially set elongation A than the stretch sensitive electroconductive device (see FIG. 38).

The stretch sensitive electroconductive characteristics of the stretch sensitive electroconductive device of the present invention were measured by mounting lead wires at the electrode portions of said device, connecting the wires to an electric resistance measuring instrument (Digital Multimeter produced by Takeda Riken) simultaneously with stretch by means of a tensile testing machine (Tensilon produced by Toyo Baldwin Co., Ltd.), and measuring electrical resistances (Ω) at respective elongations of the device. The results are shown in Table 5. As can be seen from Table 5, by setting of the indicator, the stretch sensitive electroconductive device can be set at a desired elongation, whereby a desired stretch sensitive electroconductivity (electrical resistance: Ω) can be obtained.

TABLE 5

| Sample No. | \multicolumn{15}{c}{Elongation electroconductive characteristics (Ω)} |
|---|---|---|---|---|---|---|---|---|---|---|---|---|---|---|---|
|  | 0 | 2 | 4 | 6 | 7 | 8 | 9 | 10 | 12 | 14 | 15 | 17 | 20 | 25 | 27 |
| Elongation electroconductive device* | >4.5 × 10$^6$ | >4.5 × 10$^6$ | >4.5 × 10$^6$ | >4.5 × 10$^6$ | 4.0 × 10$^6$ | 1.0 × 10$^6$ | 4.5 × 10$^5$ | 1.3 × 10$^5$ | 1.0 × 10$^4$ | 8.0 × 10$^2$ | 2.0 × 10$^2$ | 80 | 60 | 30 | 15 |
| 1 | — | — | — | — | 4.0 × 10$^6$ | 1.0 × 10$^6$ | 4.5 × 10$^5$ | 1.3 × 10$^5$ | 1.0 × 10$^4$ | 8.0 × 10$^2$ | 2.0 × 10$^2$ | 80 | 61 | 29 | 16 |
| 2 | — | — | — | — | — | — | 4.5 × 10$^5$ | 1.3 × 10$^5$ | 1.0 × 10$^4$ | 8.0 × 10$^2$ | 2.0 × 10$^2$ | — | — | — | — |
| 3 | — | — | — | — | 4.0 × 10$^6$ | 1.0 × 10$^6$ | 4.5 × 10$^5$ | 1.3 × 10$^5$ | 1.0 × 10$^4$ | 8.0 × 10$^2$ | 2.0 × 10$^2$ | 80 | 60 | 30 | — |

*Copper plates (40 μm) are adhered with an electroconductive adhesive at 1 cm of both ends.

EXAMPLE 8

A commercially available urethane type elastomer resin (solvent DMF, solid content 10 wt. %) was coated onto a release paper to a 90 μm gauge (thickness), then dried at 100° C. for 3 min. and, under semi-dried state, transferred by hot adhesion onto both surfaces of the stretch sensitive electroconductive fabric of Sample No. 3 in Example 1 at 110° C. under a pressure of 4 kg/cm$^2$, followed by drying at 100° C. for 30 minutes, to obtain a stretch sensitive electroconductive sheet 1.

Two semi-dry urethane films prepared similarly with 90 and 300 μm gauges, respectively, were laminated on both surfaces of the above stretch sensitive electroconductive fabric to obtain a stretch sensitive electroconductive sheet 2.

Next, the stretch sensitive electroconductive sheets 1 and 2 were cut in the bias direction into strips of 1 cm width×5 cm length, bonded with copper plates with a thickness of 40 μm at both surfaces 1 cm apart from both copper plates with an electroconductive adhesive, soldered at above both copper plates with lead wires to prepare stretch sensitive electroconductive devices 1.2 which will be lowered in electrical resistance value between the two lead wires from $4.5 \times 10^6 \Omega$ to $60 \Omega$ by 20% elongation.

The stretch sensitive electroconductive device 1 was dipped in a commercially available two-liquid type silicone varnish (for soft purpose; solid content 40 wt. %; solvent: toluene), then dried on air for 10 minutes to 30 minutes and dried at 130° C. for one hour. This cycle was repeated three times to obtain Sample No. 1 which is a stretch sensitive electroconductive device of the present invention as shown in Table 6. Next, onto release papers urethane type elastomer resin were coated at 400 μm gauge and dried at 100° C. for 4 minutes, followed by hot adhesion transfer of that semi-dry urethane type resin on both surfaces of the stretch sensitive electroconductive device 1 as previously described at 110° C. under a pressure of 4 kg/cm². The product was dried at 120° C. for one hour and cut into a strip of 2 cm width×10 cm length to obtain Sample No. 2 which is an stretch sensitive electroconductive device of the present invention as shown in Table 6. Similarly, only on one surface of the stretch sensitive electroconductive sheet 1 was laminated the above transfer film to obtain Sample No. 3 which is an stretch sensitive electroconductive device of present invention as shown in Table 6. Next, the stretch sensitive electroconductive device 1 was sandwiched between two sheets of a knitted fabric using Spandex and nylon 6 produced by Asahi Chemical Industry Co., Ltd. of 2 cm width×6 cm length, stitched with a machine around the lead wires and electrode portions and subjected to zigzag chain stitch along the stretch sensitive electroconductive device 1 between both electrode plates to obtain Sample No. 4 which is a stretch sensitive electroconductive device of the present invention as shown in Table 6.

Further, on the two electrode plates on the side of the insulating urethane film (with 300 μm gauge coating) of the stretch sensitive electroconductive device 2, a commercially available insulating vinyl tape was plastered to prepare Sample No. 5 which is an stretch sensitive electroconductive device of the present invention as shown in Table 6.

The electrical insulating properties of Sample Nos. 1 to 5 of the present invention were measured by pinching its two electrode portions to the portions 5 mm apart from the ends with a tensile testing machine (Tensilon produced by Toyo Baldwin Co.,) elongating the sample to 20% and measuring electrical insulating property by contacting the terminals of a commercially available tester with the electrically insulated side of the electrode portions at both ends not sandwiched with the parts of Tensilon. The results are summarized in Table 6 together with the stretch sensitive electroconductive device 1 employed as Control. As can be seen from Table 6, the stretch sensitive electroconductive devices of the present invention are maintained in electrical insulating property on at least one surface.

load applied on the upper electrode was changed. The changes in resistance value between the upper electrode and the lower electrode were measured to obtain the results shown in Table 7.

As the upper electrode, an electrode having an aluminum foil (100 μm thickness) laminated on the pressurizing surface was employed, while an electrode having a copper plate (1 mm thickness) laminated thereon was used as the lower electrode.

The pressure sensitive electroconductive fabric has a tensile strength of 5 kg/cm² and an elongation of 25% at break point, and it can be understood that it is useful as a pressure sensitive electroconductive sheet which will be broken with difficulty by flexing or drawing.

TABLE 7

| | Pressure (g/cm²) | | | | | |
|---|---|---|---|---|---|---|
| | 0 | 10 | 30 | 50 | 100 | 200 |
| Electrical resistance value (Ω) | >4.5 × 10⁶ | 4 × 10⁶ | 6 × 10⁴ | 6 × 10² | 3 × 10² | 2 × 10² |

What is claimed is:

1. A stretch sensitive electroconductive woven fabric comprising a plural number of longitudinal yarns and lateral yarns constituting a fabric strip having a shape which is substantially rectangular, in which conductive yarns are used for one of the longitudinal or lateral yarns constituting said fabric and insulating yarns for the other, and the longitudinal yarns and lateral yarns constituting said fabric strip are slanted relative to the longer direction of the fabric strip, and wherein the woven fabric is deformable and has an electrical resistance that varies with the degree of deformation.

2. A deformation sensitive electroconductive sheet comprising a deformation sensitive electroconductive woven fabric according to claim 1, wherein an elastomer is laminated on at least one surface of the fabric.

3. A deformation sensitive electroconductive device comprising a stretch sensitive electroconductive woven fabric according to claim 1, wherein electrodes for detecting changes in conductivity caused by deformation are mounted on at least two positions on the fabric.

4. A deformation sensitive electroconductive device according to claim 3, wherein the electrodes are provided on the stretch sensitive electroconductive woven fabric having an elastomer laminated on at least one

TABLE 6

Results of evaluation of electrical insulation of invention products

| | Sample No. | Insulating means | Reading of electrical resistance value between test terminals (on 20% elongation of stretch sensitive electroconductive device) (Ω) |
|---|---|---|---|
| Present invention | 1 | Embedded in silicon resin | >4.5 × 10⁶ |
| | 2 | Both surfaces laminated with urethane film | >4.5 × 10⁶ |
| | 3 | One surface laminated with urethane film | >4.5 × 10⁶ |
| | 4 | Both surfaces laminated with jersey by stitching | >4.5 × 10⁶ |
| | 5 | Vinyl tape plastered on electrode plates | >4.5 × 10⁶ |
| Control | Stretch sensitive electroconductive device 1,2 | — | 60 |

EXAMPLE 9

Figure 48:
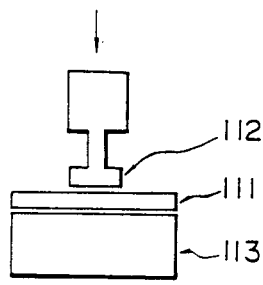
FIG. 48 is an illustration of the principle of the device for measuring pressure sensitive electroconductivity.

The deformation sensitive electroconductive fabric of Sample No. 3 in Example 1 was set by inserting between the upper electrode 112 (bottom area 2 cm²) and the lower electrode 113 as shown in FIG. 48, and the surface thereof.

5. A deformation sensitive electroconductive device according to claim 3, wherein the electrodes are provided on the stretch sensitive electroconductive woven fabric having an insulating elastomer laminated on one surface and an elastomer film with a thickness of 3 μm or less capable of causing insulation breakdown laminated on the other surface.

6. A deformation sensitive electroconductive device according to claim 3, wherein metal plates are used as the electrodes.

7. A deformation sensitive electroconductive device according to claim 3, wherein electroconductive sheets are used as the electrodes.

8. A deformation sensitive electroconductive device according to claim 3, wherein hooks are used as the electrodes.

9. A deformation sensitive electroconductive device according to claim 3, wherein convex portions of hooks are used as the electrodes.

10. A deformation sensitive electroconductive device according to claim 3, wherein eyelets are used as the electrodes.

11. A deformation sensitive electroconductive device according to claim 3, wherein the whole surface of at least one surface of a deformation sensitive electroconductive device is under insulating condition.

12. A deformation sensitive electroconductive device according to claim 3, wherein an indicator is mounted on the deformation sensitive electroconductive device so as to enable setting of a desired elongation.

13. A deformation detection unit comprising a deformation sensitive electroconductive device according to claim 3, having a means for fixing the deformation sensitive electroconductive device onto a subject to be tested.

14. A deformation detection unit according to claim 13, wherein the subject to be tested has a deformation stress and said unit has means for concentrating the deformation stress of the subject to be tested at the sensitive range of said device.

15. A deformation sensitive unit according to claim 13 having a means for controlling the deformed region of said device.

16. A deformation sensitive electroconductive woven fabric comprising yarns having intertwined portions, wherein the ratio of the number of the portions under insulating condition to the number of the portions under electroconductive condition at each of the intertwined portions of the yarns and the portions between the intertwined portions of the yarns is 1/9 or more, and wherein the woven fabric is deformable and has an electrical resistance that varies with the degree of deformation.

17. A deformation sensitive electroconductive woven fabric according to claim 16, wherein said ratio is ⅓ or more and $10^3$ or less.

18. A deformation sensitive electroconductive woven fabric according to claim 16, wherein one or more small portion under electroconductive condition is arranged in the direction of its length between the intertwined portions of the fibers constituting the deformation sensitive electroconductive woven fabric.

19. A deformation sensitive electroconductive sheet comprising a deformation sensitive electroconductive woven fabric according to claim 16, wherein an elastomer is laminated on at least one surface of the fabric.

20. A deformation sensitive electroconductive device comprising a deformation sensitive electroconductive woven fabric according to claim 16 wherein electrodes for detecting the changes in conductivity caused by deformation are mounted on at least two positions on the fabric.

21. A deformation sensitive electroconductive device according to claim 20, wherein the electrodes are provided on the deformation sensitive electroconductive woven fabric having an elastomer laminated on at least one surface thereof.

22. A deformation sensitive electroconductive device according to claim 21, wherein the electrodes are provided on the deformation sensitive electroconductive woven fabric having an insulating elastomer laminated on one surface and an elastomer film with a thickness of 3 μm or less capable of causing insulation breakdown laminated on the other surface.

23. A deformation sensitive electroconductive device according to claim 20, wherein metal plates are used as the electrodes.

24. A deformation sensitive electroconductive device according to claim 20, wherein electroconductive sheets are used as the electrodes.

25. A deformation sensitive electroconductive device according to claim 20, wherein hooks are used as the electrodes.

26. A deformation sensitive electroconductive device according to claim 20, wherein convex portions of hooks are used as the electrodes.

27. A deformation sensitive electroconductive device according to claim 20, wherein eyelets are used as the electrodes.

28. A deformation sensitive electroconductive device according to claim 20, wherein the whole surface of at least one surface of a deformation sensitive electroconductive device is under insulating condition.

29. A deformation sensitive electroconductive device according to claim 20, wherein an indicator is mounted on the deformation sensitive electroconductive device so as to enable setting of a desired elongation.

30. A deformation detection unit comprising a deformation sensitive electroconductive device according to claim 20, having a means for fixing the deformation sensitive electroconductive device onto a subject to be tested.

31. A deformation detection unit according to claim 30, wherein the subject to be tested has a deformation stress and said unit has means for concentrating the deformation stress of the subject to be tested at the sensitive range of said device.

32. A deformation detection unit according to claim 30, having a means for controlling the deformed region of said device in fixing the deformation sensitive electroconductive device onto the subject to be tested.

33. A deformation sensitive electroconductive knitted fabric comprising yarns having intertwined portions, wherein the ratio of the number of the portions under insulating condition to the number of the portions under electroconductive condition at the intertwined portions of the yarns is 1/90 or more, and wherein the knitted fabric is deformable and has an electrical resistance that varies with the degree of deformation.

34. A deformation sensitive electroconductive knitted fabric according to claim 32, wherein said ratio is 1/9 or more and $10^3$ or less.

35. A deformation sensitive electroconductive sheet comprising a deformation sensitive electroconductive knitted fabric according to claim 32, wherein an elastomer is laminated on at least one surface of the fabric.

36. A deformation sensitive electroconductive device comprising a deformation sensitive electroconductive knitted fabric according to claim 33, wherein electrodes for detecting the changes in conductivity caused by deformation are mounted on at least two positions on the fabric.

37. A deformation sensitive electroconductive device according to claim 36, wherein the electrodes are provided on the deformation sensitive electroconductive knitted fabric having an elastomer laminated on at least one surface thereof.

38. A deformation sensitive electroconductive device according to claim 36, wherein the electrodes are provided on the deformation sensitive electroconductive knitted fabric having an insulating elastomer laminated on one surface and an elastomer film with a thickness of 3 μm or less capable of causing insulation breakdown laminated on the other surface.

39. A deformation sensitive electroconductive device according to claim 36, wherein metal plates are used as the electrodes.

40. A deformation sensitive electroconductive device according to claim 36, wherein electroconductive sheets are used as the electrodes.

41. A deformation sensitive electroconductive device according to claim 36, wherein hooks are used as the electrodes.

42. A deformation sensitive electroconductive device according to claim 36, wherein convex portions of hooks are used as the electrodes.

43. A deformation sensitive electroconductive device according to claim 36, wherein eyelets are used as the electrodes.

44. A deformation sensitive electroconductive device according to claim 36, wherein the whole surface of at least one surface of a deformation sensitive electroconductive device is under insulating condition.

45. A deformation sensitive electroconductive device according to claim 36, wherein an indicator is mounted on the deformation sensitive electroconductive device so as to enable setting of a desired elongation.

46. A deformation detection unit comprising a deformation sensitive electroconductive device according to claim 36, having a means for fixing the deformation sensitive electroconductive device onto a subject to be tested.

47. A deformation detection unit according to claim 46, wherein the subject to be tested has a deformation stress and said unit has means for concentrating the deformation stress of the subject to be tested at the sensitive range of said device.

48. A deformation detection unit according to claim 46, having a means for controlling the deformed region of said device in fixing the deformation sensitive electroconductive device onto the subject to be tested.

* * * * *